United States Patent [19]
Kaji et al.

[11] Patent Number: 5,442,546
[45] Date of Patent: Aug. 15, 1995

[54] SYSTEM AND METHOD FOR AUTOMATICALLY GENERATING TRANSLATION TEMPLATES FROM A PAIR OF BILINGUAL SENTENCES

[75] Inventors: Hiroyuki Kaji, Tama; Yuko Kida; Yasutsugu Morimoto, both of Yokohama, all of Japan

[73] Assignee: Hitachi, Ltd., Tokyo, Japan

[21] Appl. No.: 983,147

[22] Filed: Nov. 30, 1992

[30] Foreign Application Priority Data

Nov. 29, 1991 [JP] Japan ................................. 3-315981

[51] Int. Cl.[6] ........................ G06F 17/20; G06F 17/28
[52] U.S. Cl. ............................ 364/419.08; 364/419.14
[58] Field of Search ............ 364/419.1, 419.07, 419.08, 364/419.14

[56] References Cited

U.S. PATENT DOCUMENTS

| | | | |
|---|---|---|---|
| 4,599,612 | 7/1986 | Kaji et al. | 340/723 |
| 4,641,264 | 2/1987 | Nitta et al. | 364/419.08 |
| 4,916,614 | 4/1990 | Kaji et al. | 364/419 |
| 5,020,021 | 5/1991 | Kaji et al. | 364/DIG. 2 |
| 5,099,425 | 3/1992 | Kanno et al. | 364/419.08 |
| 5,101,349 | 3/1992 | Tokuume et al. | 364/419 |
| 5,170,349 | 12/1992 | Yagisawa et al. | 364/419 |
| 5,181,163 | 1/1993 | Nakajima et al. | 364/419 |
| 5,227,971 | 7/1993 | Nakajima et al. | 364/419 |
| 5,268,839 | 12/1993 | Kaji | 364/419.03 |
| 5,311,429 | 5/1994 | Tominaga | 364/419.01 |

*Primary Examiner*—Gail O. Hayes
*Assistant Examiner*—A. Bodendorf
*Attorney, Agent, or Firm*—Antonelli, Terry, Stout & Kraus

[57] ABSTRACT

To automatically generate translation templates containing variables which can be replaced with various words or phrases from a bilingual pair of sentences, the machine translation system reads the first language sentence and second language sentence which are mutually equivalent, analyzes the morphemes and phrases of the sentences, identifies the word correspondence between the first language sentence and the second language sentence with reference to the bilingual dictionary, generates a translation template by replacing the corresponding words of the first language sentence and second language sentence with variables which are mutually correspondent, extracts the phrase correspondence between the first language sentence and the second language sentence, generates a generalized template wherein the corresponding phrases are replaced with variables, and generates a partial template wherein the corresponding phrases are separated. By doing this, a translation template can be learned (automatically generated) from bilingual pair of sentences, and high quality translation can be obtained.

19 Claims, 27 Drawing Sheets

FIG. 3

| 321 | 322 | 323 | 324 |
|---|---|---|---|
| KUUHAKU | KUUHAKU | N | - |
| TAIPU | TAIPUSURU | V | SAGYOU HENKAKU |
| TSUKA | TSUKAU | V | WAGYOU GODAN |
| TOKI | TOKI | N | - |
| NI | NI | P | - |
| WO | WO | P | - |

FIG. 4

| 331 | 332 | 333 | 334 |
|---|---|---|---|
| A | A | ART | - |
| SPACE | SPACE | N | (PLURAL)-S |
|  |  | V | (THIRD PERSON, SINGULAR, PRESENT)-S<br>(PAST)-D<br>(PAST PARTICIPLE)-D |
| TO | TO | P | - |
|  |  | TO | - |
| TYPE | TYPE | N | (PLURAL)-S |
|  |  | V | (THIRD PERSON, SINGULAR, PRESENT)-S<br>(PAST)-D<br>(PAST PARTICIPLE)-D |
| USE | USE | V | (THIRD PERSON, SINGULAR, PRESENT)-S<br>(PAST)-D<br>(PAST PARTICIPLE)-D |
|  |  | N | UNCOUNTABLE |

FIG. 5(a)

| X1 [N, NP] WO TAIPUSURU TOKI NI TSUKAU | is = 1 | ie = 6 | c = S | v=0100000000000 |
|---|---|---|---|---|
| USE TO TYPE A X1 [N, NP] | js = 1 | je = 5 | d = S | w=0000000001 |

FIG. 5(b)

| X1 [VP/RT] TOKI NI TSUKAU | is = 1 | ie = 6 | c = S | v=0111110000000 |
|---|---|---|---|---|
| USE TO X1 [VP] | js = 1 | je = 5 | d = S | w=0000011111 |

FIG. 5(c)

| X1 [N, NP] WO TAIPUSURU | is = 1 | ie = 3 | c=VP/RT | v=0100000000000 |
|---|---|---|---|---|
| TYPE A X1 [N, NP] | js = 3 | je = 5 | d = VP | w=0000000001 |

FIG. 6

| 211 | 212 | 213 | 214 |
|---|---|---|---|
| KUUHAKU | KUUHAKU | N | 5 |
| WO | WO | P | - |
| TAIPUSURU | TAIPUSURU | V/RT | 3 |
| TOKI | TOKI | N | - |
| NI | NI | P | - |
| TSUKAU | TSUKAU | V/SH | 1 |

FIG. 7

| 221 | 222 | 223 | 224 |
|---|---|---|---|
| USE | USE | N, V | 6 |
| TO | TO | P, TO | - |
| TYPE | TYPE | N, V | 3 |
| A | A | ART | - |
| SPACE | SPACE | N, V | 1 |

FIG. 8

| VP/SH, S | | | | | |
|---|---|---|---|---|---|
| PP | | | | | |
| NP | | VP/SH | | | |
| VP/RT | | PP | | | |
| PP | | NP | | | |
| N, NP | P | V/RT, VP/RT | N, NP | P | V/SH, VP/SH |
| KUUHAKU | WO | TAIPUSURU | TOKI | NI | TSUKAU |

FIG. 9

| VP, S |       |     |     |          |
|-------|-------|-----|-----|----------|
|       | S/TO  |     |     |          |
|       |       | VP  |     |          |
|       |       |     | NP  |          |
| V, VP | TO    | V   | ART | N, NP    |
| USE   | TO    | TYPE| A   | SPACE    |

FIG. 11

$$\begin{cases} NP \to N \\ VP/SH \to V/SH \\ VP/RT \to V/RT \\ VP/RY \to V/RY \\ S \to VP/SH \\ NP \to VP/RT\ NP \\ PP \to NP\ P \\ VP/SH \to PP\ VP/SH \\ VP/RT \to PP\ VP/RT \\ VP/RY \to PP\ VP/RY \\ VP/SH \to VP/RY\ VP/SH \end{cases}$$

FIG. 15

$$\begin{cases} NP \to N \\ VP \to V \\ S \to VP \\ S \to S/TO \\ NP \to ADJ\ N \\ NP \to ART\ NP \\ NP \to NP\ S/TO \\ PP \to P\ NP \\ VP \to V\ NP \\ VP \to VP\ PP \\ VP \to VP\ S/TO \\ S/TO \to TO\ VP \\ S \to NP\ VP \end{cases}$$

FIG. 13

| | | | | | |
|---|---|---|---|---|---|
| VP/SH, S | | | | | |
| PP | | | | | |
| NP | | VP/SH, S | | | |
| VP/RT | | PP | VP/SH, S | | |
| PP | | NP | PP | | |
| N, NP | P | V/RT, VP/RT | N, NP | P | V/SH, VP/SH, S |
| KUUHAKU | WO | TAIPUSURU | TOKI | NI | TSUKAU |

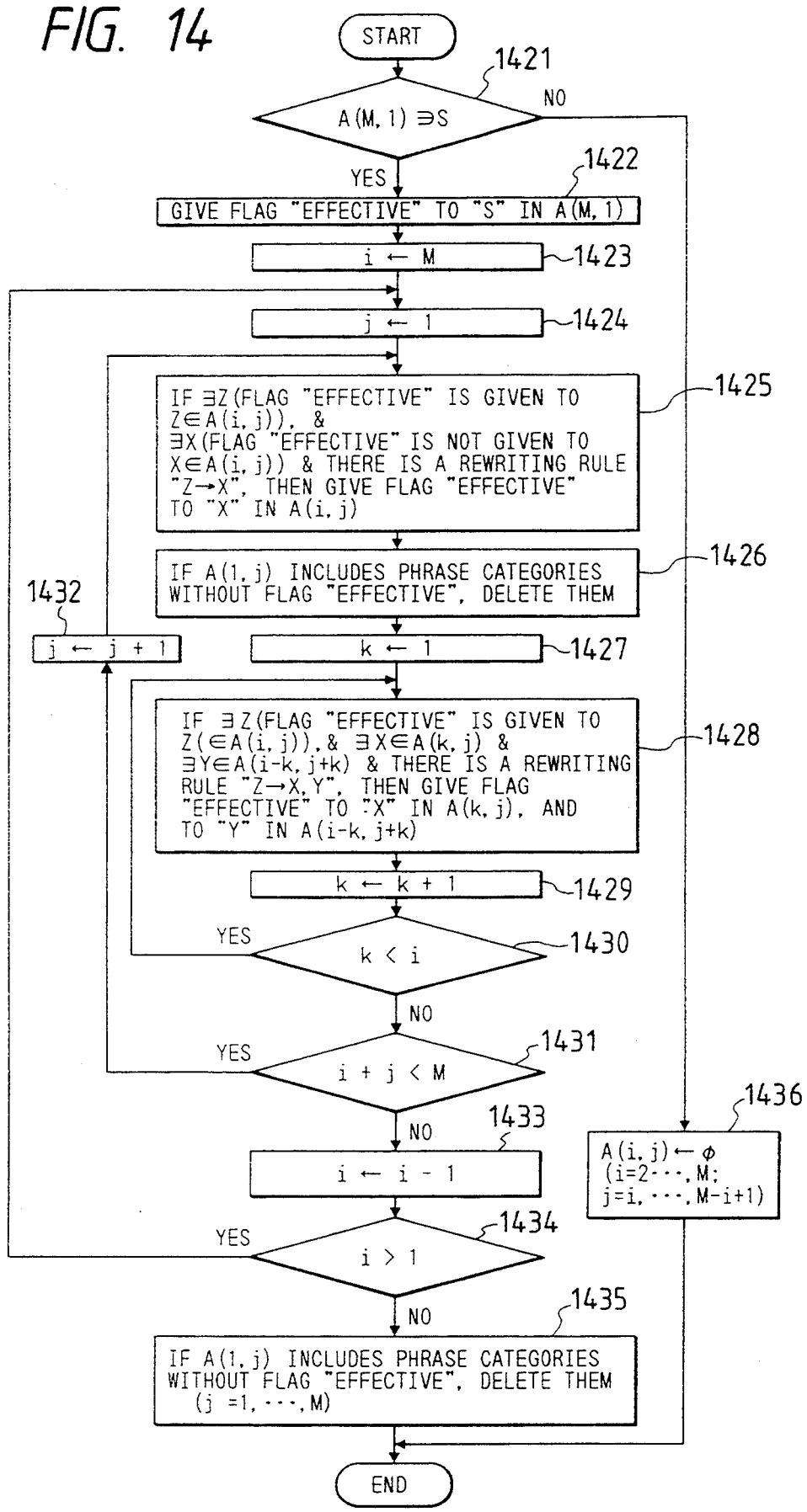

FIG. 16

| | | | | |
|---|---|---|---|---|
| NP, VP, S | | | | |
| | S/TO, S | | | |
| NP, VP, S | | VP, S | | |
| | PP, S/TO | | NP | |
| N, V, NP, VP, S | P, TO | N, V, NP, VP, S | ART | N, V, NP, VP, S |
| USE | TO | TYPE | A | SPACE |

FIG. 21(a)

```
KUUHAKU WO TAIPU SURU TOKI
NI TSUKAU.

USE TO TYPE A SPACE
```

FIG. 21(b)

```
KUUHAKU WO TAIPU SURU TOKI
NI TSUKAU.

USE TO TYPE A SPACE
```

FIG. 21(c)

```
KUUHAKU WO TAIPU SURU

TYPE A SPACE
```

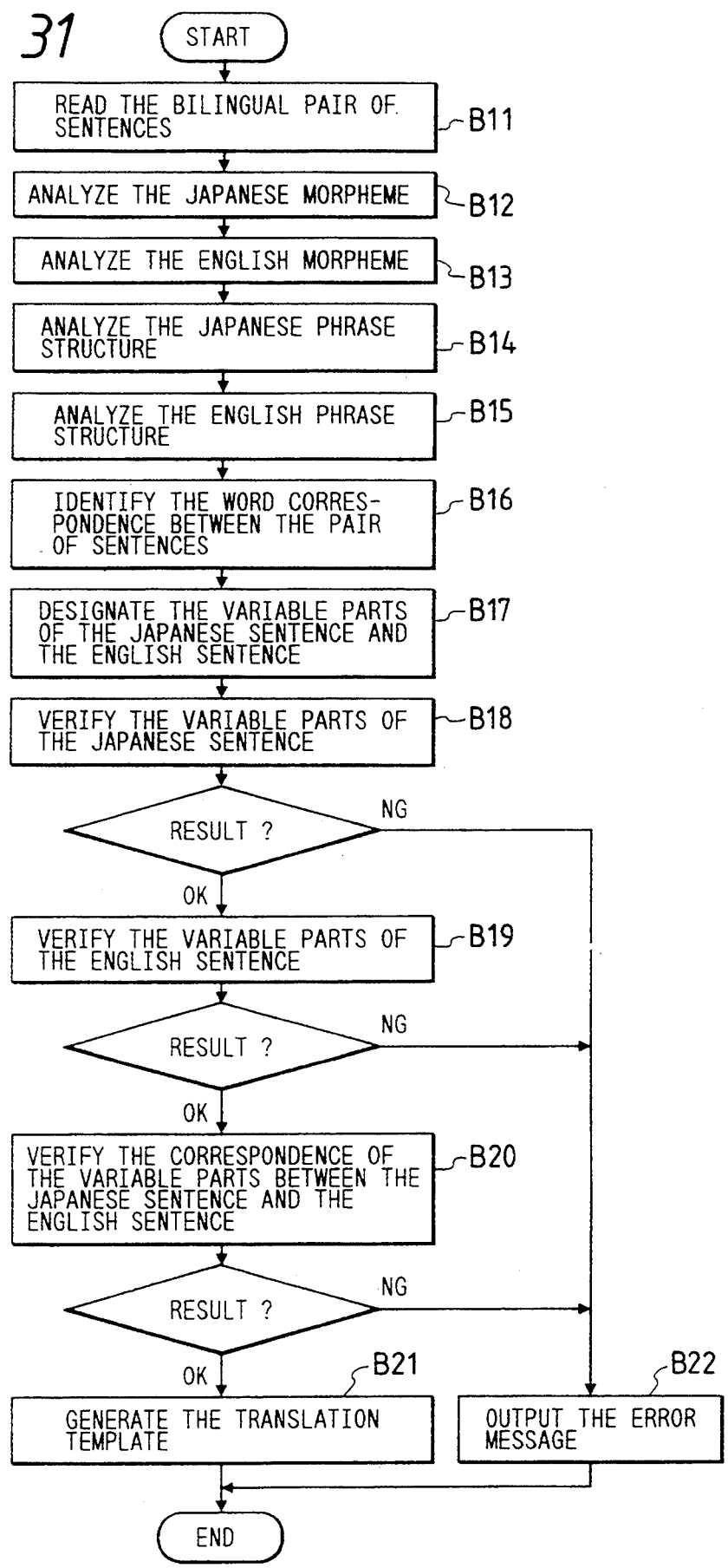

SYSTEM AND METHOD FOR AUTOMATICALLY GENERATING TRANSLATION TEMPLATES FROM A PAIR OF BILINGUAL SENTENCES

BACKGROUND OF THE INVENTION

1. Field of the Invention

The present invention relates to a machine translation system for using a translation template in the format of bilingual pair of sentences which contain variables which can be replaced with various words or phrases. More specifically, the invention relates to a translation template learning method and translation template learning system for inputting bilingual pair of sentences and automatically generating a translation templates.

2. Description of the Prior Art

Machine translation of a natural language sentence is realized, as indicated in, for example, Japanese Patent Laid-Open No. 58-40684, by a process of source language analysis and target language generation. The elements of intermediate expression obtained by analysis of the source language sentence are words constituting the source language sentence or concepts expressed by words constituting the source language sentence. A target language sentence is generated by assigning the corresponding word of the target language to each element of the intermediate expression. The above method generates a word-for-word translation and has a disadvantage that it is difficult in principle to obtain a translation which is less dependent of the wording and structure of the source language sentence.

As a method for covering up the above disadvantage, a method for using a template, that is a bilingual pair of sentences containing variable parts. The variable parts are translated by the conventional machine translation method, though the other parts are translated by dead copy of the template. The parts other than the variable parts do not necessarily have correspondence at the word level. A translation method using a template is indicated in, for example, Japanese Patent Examined Publication No. 1-58545 and Japanese Patent Laid-Open No. 3-116273.

In the case of the above translation template, it is necessary to prepare a bilingual pair of sentences and manually specify variable parts. Furthermore, it is troublesome and difficult to input many translation templates.

SUMMARY OF THE INVENTION

An object of the present invention is to solve the problems inherent in the aforementioned prior art, that is, to automatically generate several translation templates from a bilingual pair of sentences. Another object of the present invention is to automatically generate a plurality of translation templates at different generalization levels from a bilingual pair of sentences by using not only words but also phrases at an arbitrary level as parts to be replaced with variables. A further object of the present invention is to automatically generate a translation template corresponding to a phrase which is separated from sentence instead of the entire sentence.

To attain the above objects, the translation template learning method relating to the present invention generates a translation template by the bilingual pair of sentences reading step for reading a sentence in the first language and its equivalent sentence in the second language, by the word correspondence between the pair of sentences identification step for identifying the correspondence between the words of the first language sentence and the second language sentence which are read by the bilingual pair of sentences reading step with reference to the bilingual dictionary between the first and second languages, and by the translation template generation step for selecting an optional subset from the set of correspondences which are identified by the above word correspondence between the pair of sentences identification step and replacing both the word in the first language sentence and the word in the second language sentence with an identical variable for each correspondence belonging to the above subset.

Furthermore, the translation template learning method of the present invention has the translation template generalization step for generating a generalized translation template by extracting candidate phrases from the first language sentence which is an element of the translation template, extracting candidate phrases from the second language sentence which is an element of the translation template, and when the same set of variables contained in a pair of a candidate phrase in the first language sentence and a candidate phrases in the second language sentence are found, by replacing both the above candidate phrase in the first language sentence and the above candidate phrase in the second language sentence with an identical variable.

Furthermore, the translation template learning method of the present invention has the partial translation template generation step for generating a partial translation template by separating the candidate phrase in the first language sentence and the candidate phrase in the second language sentence when the same set of variables contained in a pair of a candidate phrase in the first language sentence and a candidate phrase in the second language sentence are found.

Furthermore, the parts to be replaced with variables may be specified by the user for the first language sentence or for both the first language sentence and the second language sentence. Furthermore, the result of the word correspondence between pair of sentences identification step may be displayed or the pair of the first language sentence and the second language sentence from which a translation template is generated may be displayed in a format that the parts which are replaced with variables and the other parts are distinguished from each other.

Furthermore, the translation template learning system of the present invention is a translation template learning system for automatically generating a translation template consisting of the first language sentence template and the second language sentence template which contain variables which can be replaced for various words or phrases and are mutually equivalent, which has a bilingual pair of sentences reading means for reading a first language sentence and its equivalent second language sentence, a bilingual dictionary for storing the correspondence between the first language words and the second language words, and a word correspondence between pair of sentences identifying means for identifying the correspondence between the words of the first language sentence and the second language sentence which are read by the above bilingual pair of sentences reading means with reference to the above bilingual dictionary.

According to the aforementioned configuration, the present invention has the following operation. The bilingual pair of sentences reading step reads a first language sentence and its equivalent second language sentence. Hereafter, a translation template is automatically generated by the following steps. The word correspondence between pair of sentences identification step analyzes the morphemes of the first language sentence and the second language sentence and identifies the words constituting each sentence. Next, when a pair of a word of the first language sentence and a word of the second language sentence is contained in the bilingual dictionary, the word correspondence between pair of sentences identification step judges that the word of the first language sentence and the word of the second language sentence correspond to each other. The translation template generation step selects an optional subset from the set of word correspondences identified by the word correspondence between pair of sentences identification step and generates a translation template by replacing both the word in the first language sentence and the word in the second language sentence with an identical variable for each correspondence belonging to the above subset. A translation template is generated in correspondence with each subset of the set of word correspondences. The translation template generalization step has the first language phrase analysis substep and the second language phrase analysis substep.

The first language phrase analysis substep extracts candidate phrases contained in the first language sentence which is an element of the translation template according to the grammar of the first language. The second language phrase analysis substep extracts candidate phrases contained in the second language sentence which is an element of the translation template according to the grammar of the second language. The translation template generalization step searches for the same set of variables contained in a pair of a candidate phrase extracted by the first language phrase analysis substep and a candidate phrase extracted by the second language phrase analysis substep. The translation template generalization step judges that the candidate phrases containing the same sets of variables are mutually correspondent and generates a new translation template by replacing both the above candidate phrase in the first language sentence and the above candidate phrase in the second language sentence with an identical variable.

Furthermore, the partial translation template generation step searches for the same set of variables contained in a pair of a candidate phrase extracted by the first language phrase analysis substep and a candidate phrase extracted by the second language phrase analysis substep. The partial translation template generation step judges that the candidate phrases containing the same sets of variables are mutually correspondent and generates a new translation template by separating the above candidate phrase in the first language sentence and the above candidate phrase in the second language sentence.

The variable parts designation step allows the user to designate the parts to be replaced with variables in a bilingual pair of sentences. When the parts to be replaced with variables are designated only for the first language sentence, the corresponding parts in the second language sentence are automatically identified and a translation template is generated by replacing both the designated parts in the first language sentence and the parts in the second language sentence wherein the correspondence is identified with variables. When the parts to be replaced with variables are designated for both the first language sentence and second language sentence, it is confirmed that the designated parts are phrases which are mutually correspondent and then a translation template is generated. The word correspondence between pair of sentences display step displays the result of the word correspondence between pair of sentences identification step. By doing this, the operation efficiency of the user for determining the parts to be replaced with a variable is improved. The source bilingual pair of sentences display step displays the pair of the first language sentence and second language sentence from which a translation template is generated, in a format that the parts which are replaced with variables and the other parts are distinguished from each other. By doing this, the user can judge easily whether the generated translation template is appropiate.

The foregoing and other objects, advantages, manner of operation and novel features of the present invention will be understood from the following detailed description when read in connection with the accompanying drawings.

BRIEF DESCRIPTION OF THE DRAWINGS

FIG. 3 shows a record example of a Japanese dictionary file.

FIG. 4 shows a record example of an English dictionary file.

FIGS. 5(a), 5(b), and 5(c) show record examples of a translation template file.

FIG. 6 shows an example of a Japanese morphological analysis table.

FIG. 7 shows an example of an English morphological analysis table.

FIG. 8 shows an example of a Japanese phrase analysis table.

FIG. 9 shows an example of an English phrase analysis table.

FIG. 11 shows an example of the Japanese phrase structure grammar used by the Japanese phrase analysis step.

FIG. 13 shows an example of a Japanese phrase analysis table before the candidate phrase rejection is performed.

FIG. 14 is a flow chart of the candidate phrase rejection of the Japanese phrase analysis step.

FIG. 15 shows an example of the English phrase structure grammar used by the English phrase analysis step.

FIG. 16 shows an example of an English phrase analysis table before the candidate phrase rejection is performed.

FIGS. 21(a), 21(b), and 21(c) show examples of Japanese sentences for display and English sentences for display.

FIG. 31 is a flow chart of the translation template learning of the third embodiment.

DETAILED DESCRIPTION OF THE PREFERRED EMBODIMENTS

Next, a Japanese-English translation template learning (automatic generation) system will be explained as a first embodiment of the present invention.

Figure 1:
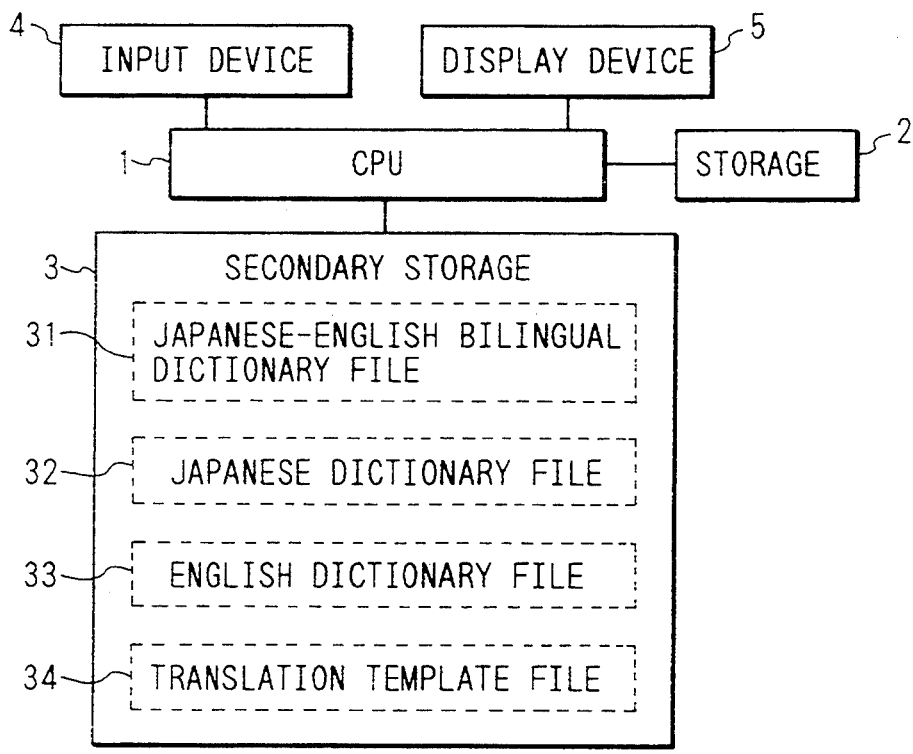
FIG. 1 is a hardware block diagram of a Japanese-English translation template learning system.

FIG. 1 shows the hardware configuration of the Japanese-English translation template learning system of this embodiment. As shown in the drawing, the Japanese-English translation template learning system of this embodiment has a central processing unit 1, a storage 2, a secondary storage 3, an input device 4, and a display device 5. A Japanese-English bilingual dictionary file 31, a Japanese dictionary file 32, an English dictionary file 33, and a translation template file 34 are stored in the secondary storage 3. Among them, the Japanese-English bilingual dictionary file 31, the Japanese dictionary file 32, and the English dictionary file 33 are created and stored beforehand. The translation template file 34 is a file for outputting translation templates which are created by the translation template learning program according to the procedure described later.

Figure 2:
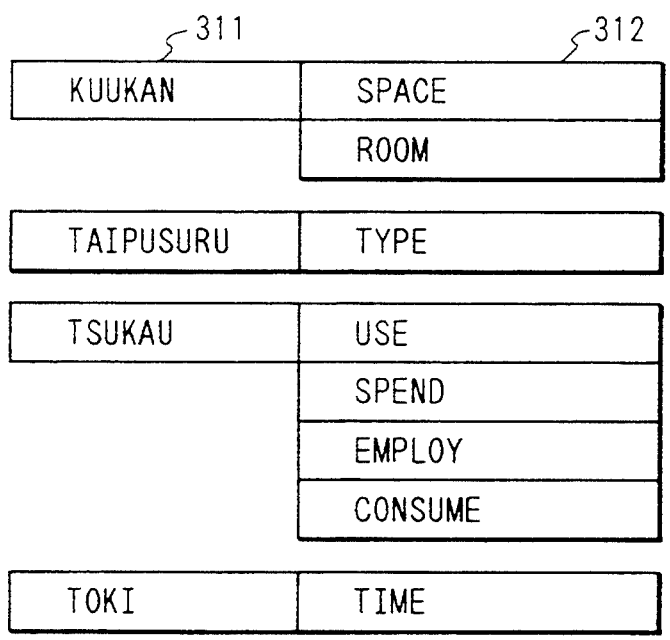
FIG. 2 shows a record example of a Japanese-English bilingual dictionary file.

FIG. 2 shows a data example of the Japanese-English bilingual dictionary file 31. As shown in the drawing, the Japanese-English bilingual dictionary file 31 has a record containing one Japanese word 311 and one or more English equivalent words 312 thereof and can be retrieved using the Japanese word 311 as a key.

FIG. 3 shows a data example of the Japanese dictionary file 32. As shown in the drawing, the Japanese dictionary file 32 has a record containing an entry word 321, a standard form 322, a part of speech 323, and inflection information 324 and can be retrieved using the entry word 321 as a key. In the case of an inflectional word, the entry word 321 is a word stem. The standard form 322 is a standard spelling of the entry word 321 and a termination form in the case of an inflectional word. The part of speech 323 is a part of speech of the entry word 321. The meanings of symbols "N" and "V" will be described later.

FIG. 4 shows a data example of the English dictionary file 33. As shown in the drawing, the English dictionary file 33 has a record containing an entry word 331, a standard form 332, a part of speech 333, and inflection information 334 and can be retrieved using the entry word 331 as a key. In the case of a multi-part of speech word, all the parts of speech are written in the part of speech 333.

FIG. 5 shows record examples of the translation template file 34. In the system of this embodiment, when a pair of Japanese and English equivalent sentences is inputted, translation templates such as those shown here are automatically generated. The three records shown in FIGS. 5(a), 5(b), and 5(c) are examples of the translation templates which are automatically generated from a bilingual pair of sentences "kuuhaku wo taipusuru toki ni tsukau./Use to type a space."

The translation template shown in FIG. 5(a) has a pair of a Japanese sentence template 341 and an English sentence template 342. The Japanese sentence template 341 is a Japanese sentence containing a variable X1 and the English sentence template 342 is an English sentence containing a variable X1. At least one phrase category is specified for the variable and it indicates that the variable can be replaced with a phrase of the specified category. The phrase is a word string such as a noun phrase and a verb phrase, or a word such as a noun and a verb, and the phrase category is a symbol representing a phrase type or a part of speech. In FIG. 5(a), [N, NP] following the variable X1 indicates that the phrase category of the phrase that can be substitued for the variable X1 is N or NP.

The meaning of the symbol of the phrase category is as follows: Firstly, among the Japanese phrase category, it is assumed that NP indicates a noun phrase, N a noun, VP/SH a shuushikei verb phrase, V/SH a shuushikei verb, VP/RT a rentaikei verb phrase, V/RT a rentaikei verb, VP/RY a renyoukei verb, V/RY a renyoukei verb, PP a prepositional phrase, P a preposition, and S a sentence. Among the English phrase category, it is assumed that NP indicates a noun phrase, N a noun, VP a verb phrase, V a verb, ADJ an adjective, ART an article, PP a prepositional phrase, P a preposition, S/TO a TO infinitive clause, and S a sentence.

As shown in FIG. 5(a), the Japanese sentence template 341 and the English sentence template 342 contain the same variables. It indicates that the same variables can be replaced with expressions which are mutually equivalent.

A record stored in the translation template file 34 contains a Japanese sentence template start position (is) 3411, a Japanese sentence template end position (ie) 3412, a Japanese sentence template phrase category (c) 3413, a bit series for selecting Japanese sentence words to be replaced with variables (v) 3414, an English sentence template start position (js) 3421, an English sentence template end position (je) 3422, an English sentence template phrase category (d) 3423, and a bit series for selecting English sentence words to be replaced with variables (w) 3424 as well as the Japanese sentence template 341 and the English sentence template 342.

The Japanese sentence template start position (is) and the Japanese sentence template end position (ie) indicate the range of the source Japanese sentence ("kuuhaku wo taipusuru toki ni tsukau." for the example in FIG. 5)

which the Japanese sentence template 341 corresponds to. The start position (is) indicates the word number of the leftmost word of the corresponding range of the Japanese sentence and the end position (ie) indicates the word number of the rightmost word of the corresponding range of the Japanese sentence. The word number is a number which is assigned to each of the words of the Japanese sentence which are separated from each other by the morphological analysis, which will be described later, sequentially starting at the head of the sentence.

The Japanese sentence template phrase category (c) shows the phrase category of the Japanese sentence template 341. The bit series for selecting Japanese sentence words to be replaced with variables (v) indicates the ranges of the source Japanese sentence which are replaced with variables so as to create the Japanese sentence template 341. The "2i"th bit of the bit series (v) corresponds to the "i"th word of the Japanese sentence. When the "2i"th bit is 1, it indicates that the "i"th word is a part which is replaced with a variable and when the "2i"th bit is 0, it indicates that the "i"th word is not a part which is replaced with a variable. Furthermore, the "2i+1"th bit of the bit series (v) indicates whether the "i"th and "i+1"th words of the Japanese sentence are replaced with an identical variable or not. When the "i"th and "i+1"th words of the Japanese sentence are replaced with an identical variable, the "2i+1"th bit of the bit series (v) is 1.

The English sentence template start position (js) and the English sentence template end position (je) indicate the range of the source English sentence ("Use to type a space." for the example in FIG. 5) which the English sentence template 342 corresponds to. The start position (js) indicates the word number of the leftmost word of the corresponding range of the English sentence and the end position (je) indicates the word number of the right most word of the corresponding range of the English sentence. The word number is a number which is assigned to each of the words of the English sentence sequentially starting at the head of the sentence. The English sentence template phrase category (d) shows the phrase category of the English sentence template 342.

The bit series for selecting English sentence words to be replaced with variables (w) indicates the ranges of the source English sentence which are replaced with variables so as to create the English sentence template 342. The "2j"th bit of the bit series (w) corresponds to the "j"th word of the English sentence. When the "2j"th bit is 1, it indicates that the "j"th word is a part which is replaced with a variable and when the "2j"th bit is 0, it indicates that the "j"th word is not a part which is replaced with a variable. Furthermore, the "2j+1"th bit of the bit series (w) indicates whether the "j"th and "j+1"th words of the English sentence are replaced with an identical variable or not. When the "j"th and "j+1"th words of the English sentence are replaced with an identical variable, the "2j+1"th bit of the bit series (w) is 1.

According to the hardware configuration shown in FIG. 1, the storage 2 is used as a storage area of the translation template learning program and sentence analysis data manipulated by the above program. Sentence analysis data (the analysis results of the inputted bilingual pair of sentences) includes a Japanese morphological analysis table 21, an English morphological analysis table 22, a Japanese phrase analysis table 23, and an English phrase analysis table 24. Examples of the Japanese morphological analysis table 21, English morphological analysis table 22, Japanese phrase analysis table 23, and English phrase analysis table 24 are shown in FIGS. 6, 7, 8, and 9 respectively. The examples use a Japanese sentence of "kuuhaku wo taipusuru toki ni tsukau." and an English sentence of "Use to type a space." which are mutually equivalent.

As shown in FIG. 6, the Japanese morphological analysis table 21 lines up the words constituting the Japanese sentence (morpheme) in the occurrence order from the head of the sentence to the tail. The data of each word (data on the corresponding row shown in the drawing) includes an occurred form 211, a standard form 212, a part of speech 213, and a corresponding word number 214. The occurred form 211, standard form 212, part of speech 213, and corresponding word number 214 of the "i"th word of the Japanese sentence are written as JW(i), JS(i), JP(i), and JT(i) respectively.

The occurred form JW(i) expresses the spelling which appears in the Japanese sentence. A plurality of symbols of parts of speech can be written in the part of speech JP(i). This is because the ambiguity of the part of speech may not be resolved. In the corresponding word number JT(i), a set of word numbers (numbers assigned to the words sequentially from the head of the English sentence) of the corresponding words in the English sentence which is equivalent to the Japanese sentence is written. The reason for writing a set of word numbers is that the word correspondence cannot be determined uniquely due to the ambiguity of the word correspondence. Furthermore, when no corresponding words are found in the English sentence or no corresponding words can be identified, the corresponding word number JT(i) is an empty set.

The English morphological analysis table 22 is the same as the Japanese morphological analysis table 21. As shown in FIG. 7, the English morphological analysis table 22 lines up the words constituting the English sentence in the occurrence order from the head of the sentence to the tails. The data of each word includes an occurred form 221, a standard form 222, a part of speech 223, and a corresponding word number 224. The occurred form 221, standard form 222, part of speech 223, and corresponding word number 224 of the "j"th word of the English sentence are written as EW(j), ES(j), EP(j), and ET(j) respectively. The occurred form EW (j) expresses the spelling which appears in the English sentence. A plurality of symbols of parts of speech can be written in the part of speech EP(j). This is because the ambiguity of the part of speech may not be resolved. In the corresponding word number ET(j), a set of word numbers (numbers assigned to the words sequentially from the head of the Japanese sentence) of the corresponding words in the Japanese sentence which is equivalent to the English sentence is written. The reason for writing a set of word numbers is that the word correspondence cannot be determined uniquely due to the ambiguity of the word correspondence. Furthermore, when no corresponding words are found in the Japanese sentence or no corresponding words can be identified, the corresponding word number ET(j) is an empty set.

The Japanese phrase analysis table 23 is a table for indicating the result of phrase analysis of the Japanese sentence of the inputted bilingual pair of sentences. As shown in FIG. 8, the Japanese phrase analysis table 23 shows the candidate phrases contained in the Japanese sentence in a form of a triangular matrix. The rows of the matrix are numbered from bottom to top and the columns of the matrix are numbered from left to right. The element of the "i"th row and "j"th column of the Japanese phrase analysis table 23 is written as A(i,j). In the element A(i,j), a set of phrase category symbols is written. When a certain phrase category symbol X is contained in the element A(i,j), it means that a string of i words starting with the "j"th word of the Japanese sentence can be set as a phrase of the X category.

The English phrase analysis table 24 is a table for indicating the result of phrase analysis of the English sentence of the inputted bilingual pair of sentences. The English phrase analysis table 24 is a table which is similar to the above Japanese phrase analysis table 23. As shown in FIG. 9, the English phrase analysis table 24 shows the candidate phrases contained in the English sentence in a form of a triangular matrix. The rows of the matrix are numbered from bottom to top and the columns of the matrix are numbered from left to right. The element of the "i"th row and "j"th column of the English phrase analysis table 24 is written as B(i,j). In the element B(i,j), a set of phrase category symbols is written. When a certain phrase category symbol X is contained in the element B(i,j), it means that a string of i words starting with the "j"th word of the English sentence can be set as a phrase of the X category.

Figure 10:
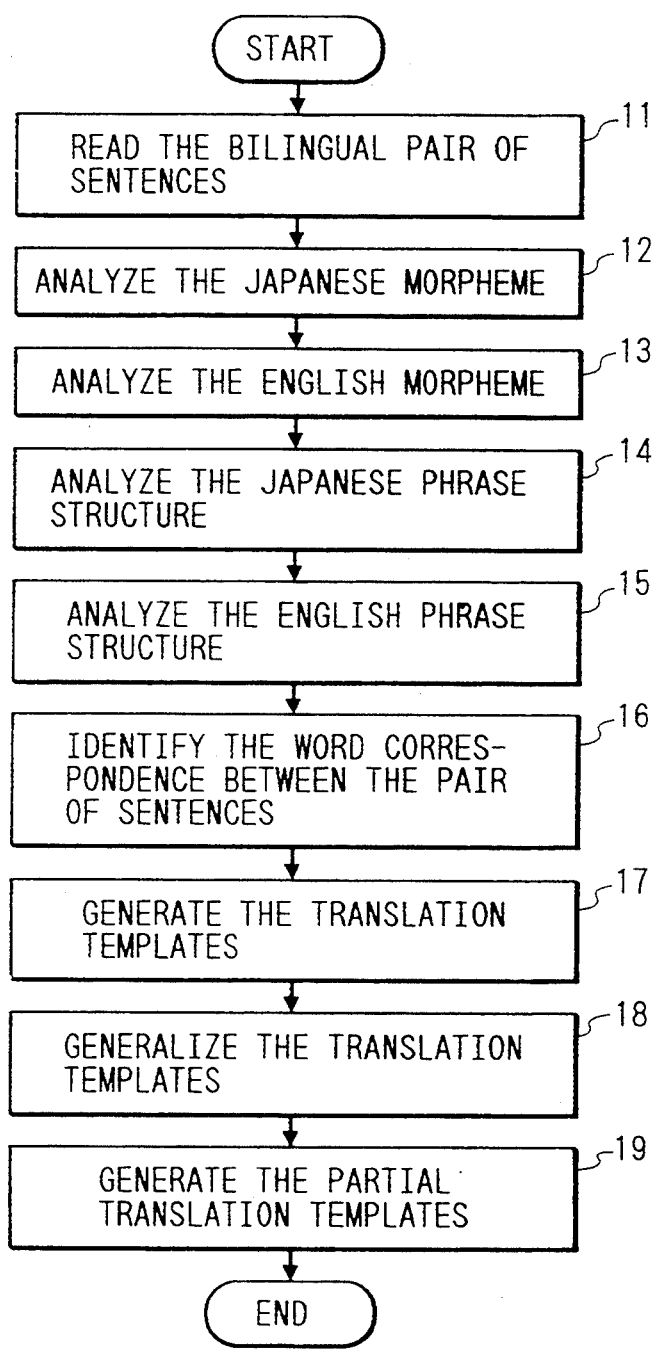
FIG. 10 is a flow chart of the translation template learning.

Next, the procedure for translation template learning, that is, the processing for automatically generating translation templates will be explained. FIG. 10 shows a flow chart of the translation template learning executed by the central processing unit 1. Firstly, in the bilingual pair of sentences reading step 11, the Japanese sentence and the English sentence which are mutually equivalent are read through the input device 4.

Next, in the Japanese morphological analysis step 12, the words constituting the inputted Japanese sentence are identified with reference to the Japanese dictionary file 32. The Japanese morphological analysis may be performed by a method indicated in, for example, Japanese Patent LaidOpen No. 61-40671. By the Japanese morphological analysis, the Japanese morphological analysis table 21 shown in FIG. 6 is obtained. Among the data fields of the Japanese morphological analysis table 21, the values of the occurred form 211, standard form 212, and part of speech 213 are set by the Japanese morphological analysis step 12. Next, in the English morphological analysis step 13, the words constituting the inputted English sentence are identified with reference to the English dictionary file 33. The English morphological analysis may be performed by a method indicated in, for example, Japanese Patent Laid-Open No. 58-40684. By the English morphological analysis, the English morphological analysis table 22 shown in FIG. 7 is obtained. Among the data fields of the English morphological analysis table 22, the values of the occurred form 221, standard form 222, and part of speech 223 are set by the English morphological analysis step 13.

Next, in the Japanese phrase analysis step 14, candidate phrases contained in the inputted Japanese sentence are extracted. For this extraction, the CYK (Cocke-YoungerKasami) method which is conventionally known is used. By the Japanese phrase analysis, the Japanese phrase analysis table 23 shown in FIG. 8 is obtained. Details about the Japanese phrase analysis step 14 will be explained later.

Next, in the English phrase analysis step 15, candidate phrases contained in the inputted English sentence are extracted. The English phrase analysis method is the same as the Japanese phrase analysis method. By the English phrase analysis, the English phrase analysis table 24 shown in FIG. 9 is obtained.

Next, in the word correspondence between pair of sentences identification step 16, the word correspondence between the Japanese sentence and the English sentence is identified with reference to the Japanese-English bilingual dictionary file 31. By the word correspondence between the pair of sentences identification, values are set to the corresponding word number 214 in the Japanese morphological analysis table 21 and the corresponding word number 224 in the English morphological analysis table 22. Details about the word correspondence between pair of sentences identification step 16 will be explained later.

Next, in the translation template generation step 17, subsets are selected successively from a set of word correspondences between the Japanese sentence and the English sentence which are obtained by the word correspondence between pair of sentences identification step 16, and translation templates are generated by replacing mutually corresponding words belonging to the above subsets with variables. The generated translation templates are registered in the translation template file 34. Details about the translation template generation step 17 will be explained later.

Furthermore, in the translation template generalization step 18, the phrase correspondence between the Japanese sentence and the English sentence is identified with reference to the Japanese phrase analysis table 23, English phrase analysis table 24, the corresponding word number 214 in the Japanese morphological analysis table 21 and the corresponding word number 224 in the English morphological analysis table 22, and then a generalized translation template is generated by replacing the identified corresponding phrases with a variable. Details about the translation template generalization step 18 will be explained later.

Finally, in the partial translation template generation step 19, the phrase correspondence between the Japanese sentence and the English sentence is identified with reference to the Japanese phrase analysis table 23, English phrase analysis table 24, the corresponding word number 214 in the Japanese morphological analysis table 21 and the corresponding word number 224 in the English morphological analysis table 22, and then a partial translation template is generated by separating only the identified corresponding phrases from the translation template. Details about the partial translation template generation step 19 will be explained later.

Next, detailed processing procedures of the Japanese phrase analysis step 14, word correspondence between pair of sentences identification step 16, translation template generation step 17, translation template generalization step 18, and partial translation template generation step 19 will be explained in this order. It is assumed that the numbers of words of the Japanese sentence and the English sentence are M and N respectively. The values of M and N are determined by the Japanese morphological analysis step 12 and the English morphological analysis step 14 respectively.

The Japanese phrase analysis step 14 has a substep for extracting candidate phrases from the Japanese sentence and a substep for rejecting some of the extracted candidate phrases. For the Japanese phrase analysis step 14, the Japanese phrase structure grammar is used.

The Japanese phrase structure grammar consists of rewriting rules as exemplified in FIG. 11. The rewriting rules are divided into two forms, "Z->X Y" and "Z->X". The rewriting rule "Z->X Y" indicates that the row of the phrase categories X and Y on the right of "->" can be replaced with the phrase category Z on the left. The rewriting rule "Z>X" indicates that the phrase category X on the right of "->" can be replaced with the phrase category Z on the left. For example, the rule "NP->N" shown in FIG. 11 indicates that a noun N can be replaced with a noun phrase NP. In the following description, X, Y, and Z are used as variables indicating phrase categories.

The processing for extracting candidate phrases from the Japanese sentence will be explained with reference to the flow chart shown in FIG. 12. Firstly, all the elements of the Japanese phrase analysis table 23 are initialized to empty (Step 1401). Next, the part of speech JP(j) of the "j"th word in the Japanese morphological analysis table 21 is copied into the element A(1,j) (j=1, ---, M) (Step 1402). Next, when the phrase category X is contained in the element A(1,j) and the rewriting rule "Z-<X" is contained in the Japanese phrase structure grammar, the processing for adding the phrase category Z to the element A(1,j) is repeated as far as possible (j=1, ---, M) (Step 1403).

Next, an initial value '2' is set to the index i indicating a row of the Japanese phrase analysis table 23 (Step 1404). Furthermore, an initial value '1' is set to the index j indicating a column of the Japanese phrase analysis table 23 (Step 1405). Furthermore, an initial value '1' is set to a variable k (Step 1406).

Next, when the phrase category X is contained in the element A(k,j), the phrase category Y is contained in the element A(i−k,j+k), and the rewriting rule "Z->X Y" is contained in the Japanese phrase structure grammar, the processing for adding the phrase category Z to the element A(i,j) is repeated as far as possible (Step 1407). Next, by adding 1 to the variable k (Step 1408), the processing of Step 1407 is repeated while the variable k is smaller than the index i (Step 1409).

Next, when the phrase category X is contained in the element A(i,j) and the rewriting rule "Z->X" is contained in the Japanese phrase structure grammar, the processing for adding the phrase category Z to the element A(i,j) is repeated as far as possible (Step 1410). Next, 1 is added to the index j (Step 1411). When j+i−1 is smaller than M, i.e. the number of words of the Japanese sentence (Step 1412), the processing for adding the phrase categories to the element A(i,j) (Steps 1406 to 1410) is executed for the updated index j. When j+i−1 exceeds M, i.e. the number of words of the Japanese sentence (Step 1412), 1 is added to the index i (Step 1413). When the index i is smaller than M, i.e. the number of words of the Japanese sentence (Step 1414), the processing for adding the phrase categories to the elements A(i,l), ---, and A(i,Mi+1) (Steps 1405 to 1412) is executed for the updated index i. When the index i exceeds, M, i.e. the number of words of the Japanese sentence (Step 1414), the processing for extracting candidate phrases ends.

Figure 12:
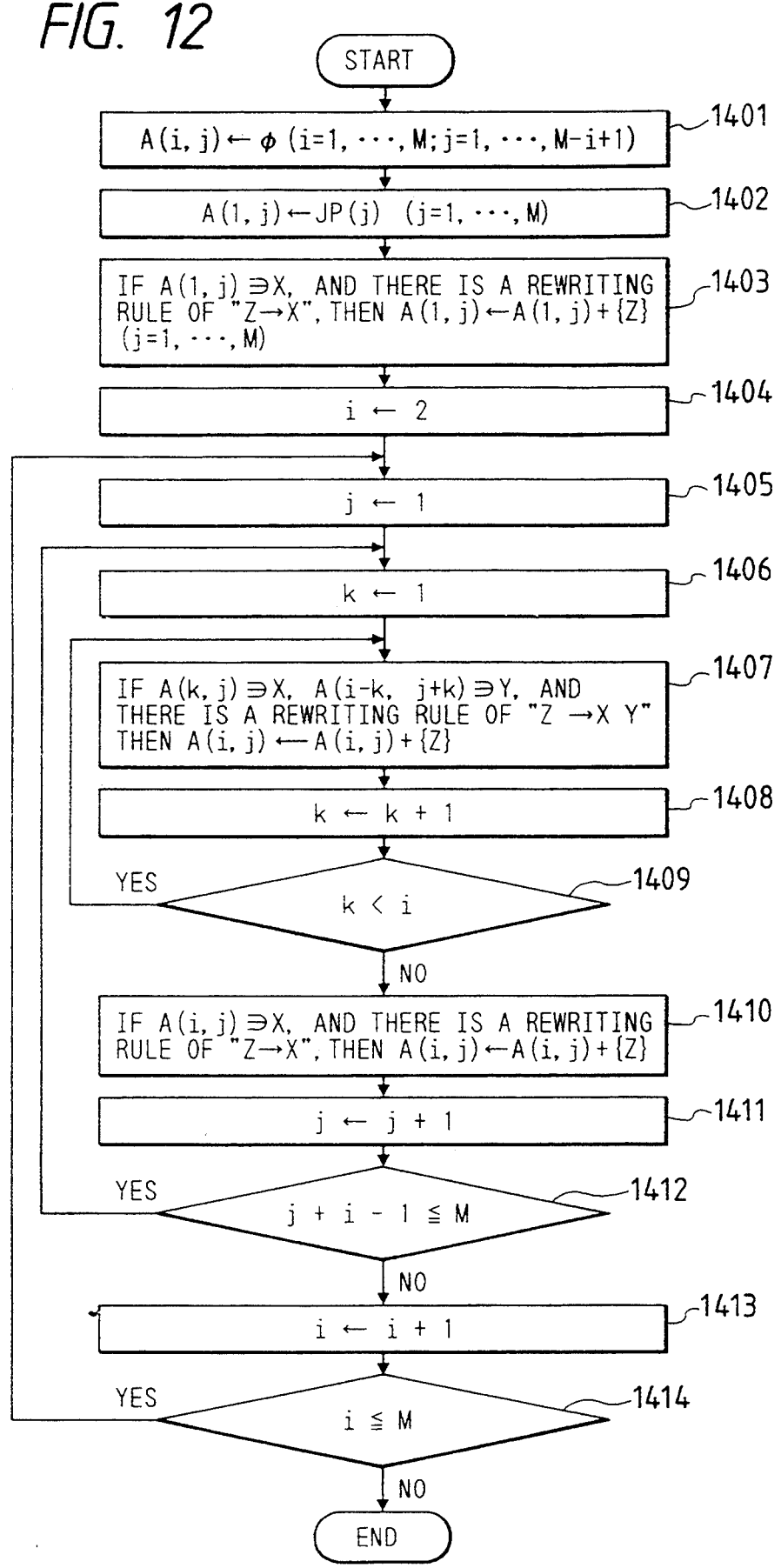
FIG. 12 is a flow chart of the candidate phrase extraction of the Japanese phrase analysis step.

FIG. 13 shows the Japanese phrase analysis table resulting from the candidate phrase extraction shown in FIG. 12 for the Japanese sentence "kuuhaku wo taipusuru toki ni tsukau." The Japanese phrase analysis table shown in FIG. 8 is the one after the next candidate phrase rejection is executed.

Next, the processing for rejecting some of the extracted candidate phrases will be explained with reference to the flow chart shown in FIG. 14. Firstly, whether a phrase category symbol S expressing "sentence" is contained in the element A(M,l) or not is checked (Step 1421). When the phrase category S is not contained in the element A(M,l) (Step 1421), all the elements of the Japanese phrase analysis table 23 other than the first row elements are made empty (Step 1436) and the processing ends.

When the phrase category S is contained in the element A(M,l) (Step 1421), flag "effective" is given to S (Step 1422). Next, M, i.e. the number of words of the Japanese sentence is set to the index i indicating a row of the Japanese phrase analysis table 23 as an initial value (Step 1423). Furthermore, an initial value '1' is set to the index j indicating a column of the Japanese phrase analysis table 23 (Step 1424).

Next, when a phrase category Z with flag "effective" is contained in the element A(i,j), a phrase category X without flag "effective" is contained in A(i,j), and a rewriting rule of "Z->X" is contained in the Japanese phrase structure grammar, the processing for giving flag "effective" to the phrase category X in the element A(i,j) is repeated as far as possible (Step 1425). Next, when phrase categories without flag "effective" are found in the element A(i,j), they are deleted from the element A(i,j) (Step 426), and an initial value '1' is set to the variable k (Step 1427).

Next, when the phrase category Z with flag "effective" is contained in the element A(i,j), the phrase category X is contained in A(k,j), the phrase category Y is contained in the element A(i−k,j+k), and a rewriting rule of "Z->X Y" is contained in the Japanese phrase structure grammar, the processing for giving flag "effective" both to the phrase category X in the element A(k,j) and to the phrase category Y in the element A(i−k,j+k) is repeated as far as possible (Step 1428). Next, by adding 1 to the variable k (Step 1429), the processing of Step 1428 is repeated while the variable k is smaller than the index i (Step 1430). When the variable k becomes equal to the index i (Step 1430), whether i+j is smaller than M, i.e. the number of words of the Japanese sentence or not is checked (Step 1431). When i+j is smaller than M, i.e. the number of words of the Japanese sentence (Step 1431), 1 is added to the index j (Step 1432) and the processing for transferring flag "effective" from the phrase categories with flag "effective" in the element A(i,j) is executed (Steps 1425 to 1430).

When i+j is not smaller than M, i.e. the number of words of the Japanese sentence (Step 1431), 1 is subtracted from the index i (Step 1433). When the index i is larger than 1 (Step 1434), the processing for transferring flag "effective" from the phrase categories with flag "effective" in the elements A(i,l), ---, and A(i,M−i,+1) is executed (Steps 1424 to 1432). When the index i becomes 1 (Step 1434), the phrase categories without flag "effective" are deleted from the element A(i,j) (j=1, ---, M) and the processing ends.

Since the English phrase analysis step 15 is exactly the same as the Japanese phrase analysis step 15, detailed description will be omitted. An example of the English phrase structure grammar used by the English phrase analysis step 15 is shown in FIG. 15. Furthermore, FIG. 16 shows an English phrase analysis table for the English sentence "Use to type a space." in a stage between the candidate phrase extraction and the candidate phrase rejection. The English phrase analysis table shown in FIG. 9 is the one after the candidate phrase rejection is performed for the same English sentence.

The word corresponding between pair of sentences identification step 16 shown in FIG. 10 has a substep for extracting candidate word correspondences between the Japanese sentence and the English sentence, a substep for selecting undeletable ones from the extracted candidate word correspondences, and a substep for resolving the ambiguity of word correspondence. Details of the substeps will be explained hereunder.

Figure 17:
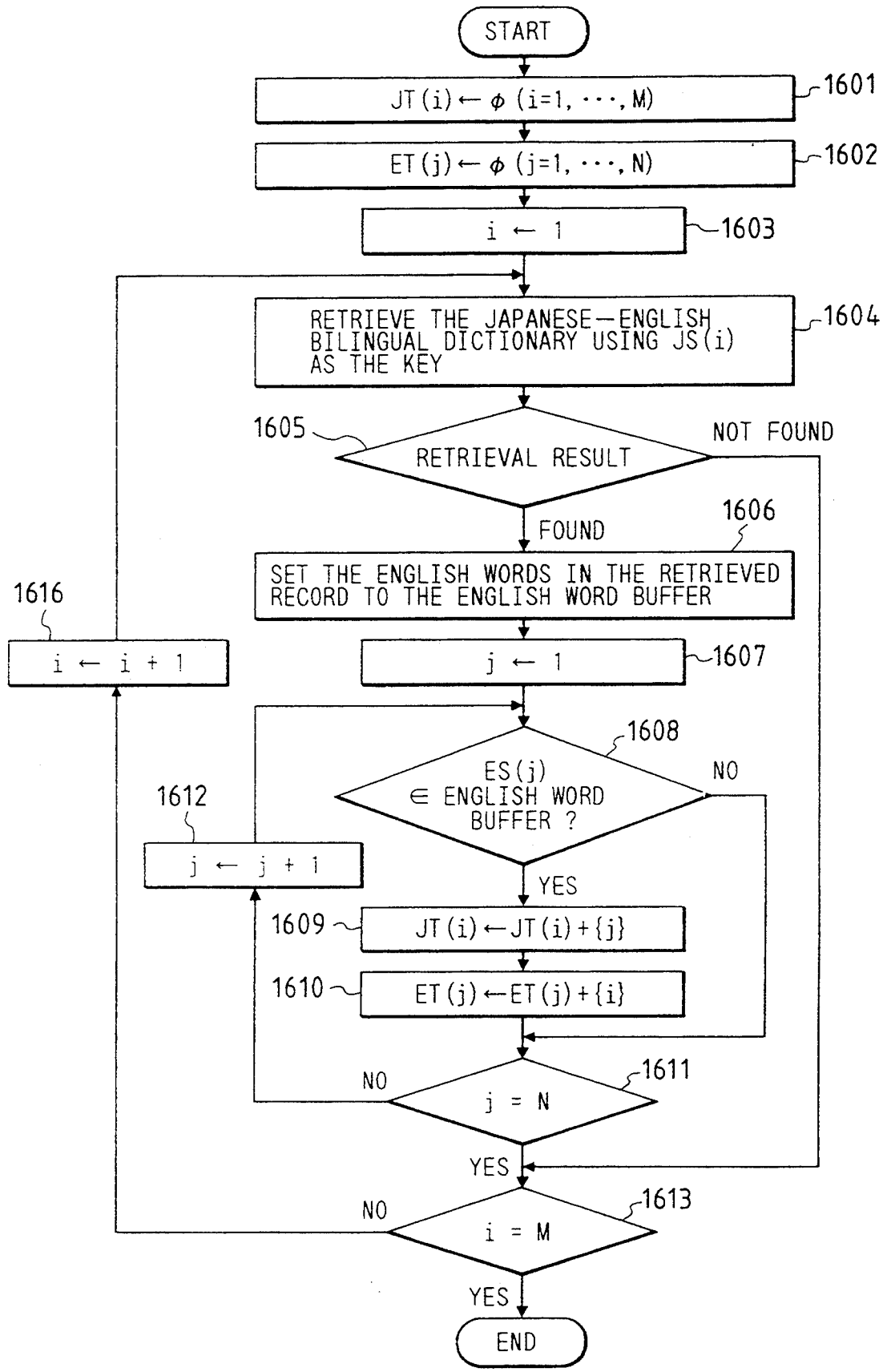
FIG. 17 is a flow chart of the word correspondence candidate extraction of the word correspondence between pair of sentences identification step.

Firstly, the processing for extracting candidate word correspondences between the Japanese sentence and the English sentence with reference to the Japanese-English bilingual dictionary file 31 will be explained using the flow chart shown in FIG. 17. Firstly, the corresponding word numbers JT(i) (i=1, M) of the Japanese morphological analysis table 21 are all initialized to empty (Step 1601). The corresponding word numbers ET(j) (j=1, ..., N) of the English morphological analysis table 22 are also all initialized to empty (Step 1602).

Next, 1 is set to an index i indicating a word of the Japanese sentence (Step 1603). The JapaneseEnglish bilingual dictionary file 31 is searched using the standard form JS(i) of the "i"th word of the Japanese sentence as a key (Step 1604). When no record can be retrieved (Step 1605), the "i"th word of the Japanese sentence is not a word which simply corresponds to an English word, so that the processing from Step 1606 to Step 1612 is skipped and the processing for checking whether the index i is equal to M, i.e. the number of words of the Japanese sentence (Step 1613) is performed immediately. When a record is retrieved (Step 1605), English equivalent words 312 written in the record are set in an English word buffer (Step 1606).

Next, 1 is set to an index j indicating a word of the English sentence (Step 1607). Next, whether the "j"th word of the English sentence is contained in the English word buffer or not is checked (Step 1608). When the "j"th word is contained in the English word buffer, it is judged that the "j"th word of the English sentence is a word corresponding to the "i"th word of the Japanese sentence, and the value of the index j is registered to the corresponding word number JT(i) in the Japanese morphological analysis table 21 (Step 1609), and the value of the index i is registered to the corresponding word number ET(j) in the English morphological analysis table 22 (Step 1610).

Next, when the index j is not equal to N, i.e. the number of words of the English sentence (Step 1611), 1 is added to the index j (Step 1612) and the step is returned to the processing for checking whether the "j"th word of the English sentence is contained in the English word buffer (Step 1608). When the index j is equal to N, i.e. the number of words of the English sentence (Step 1611), whether the index i is equal to M, i.e. the number of words of the Japanese sentence or not is checked (Step 1613). When the index i is equal to M, i.e. the number of words of the Japanese sentence, the processing ends. When the index i is not equal to M, i.e. the number of words of the Japanese sentence, 1 is added to the index i (Step 1616) and the processing for identifying the word in the English sentence which corresponds to the "i"th word of the Japanese sentence is repeated (Steps 1604 to 1612).

Figure 18:
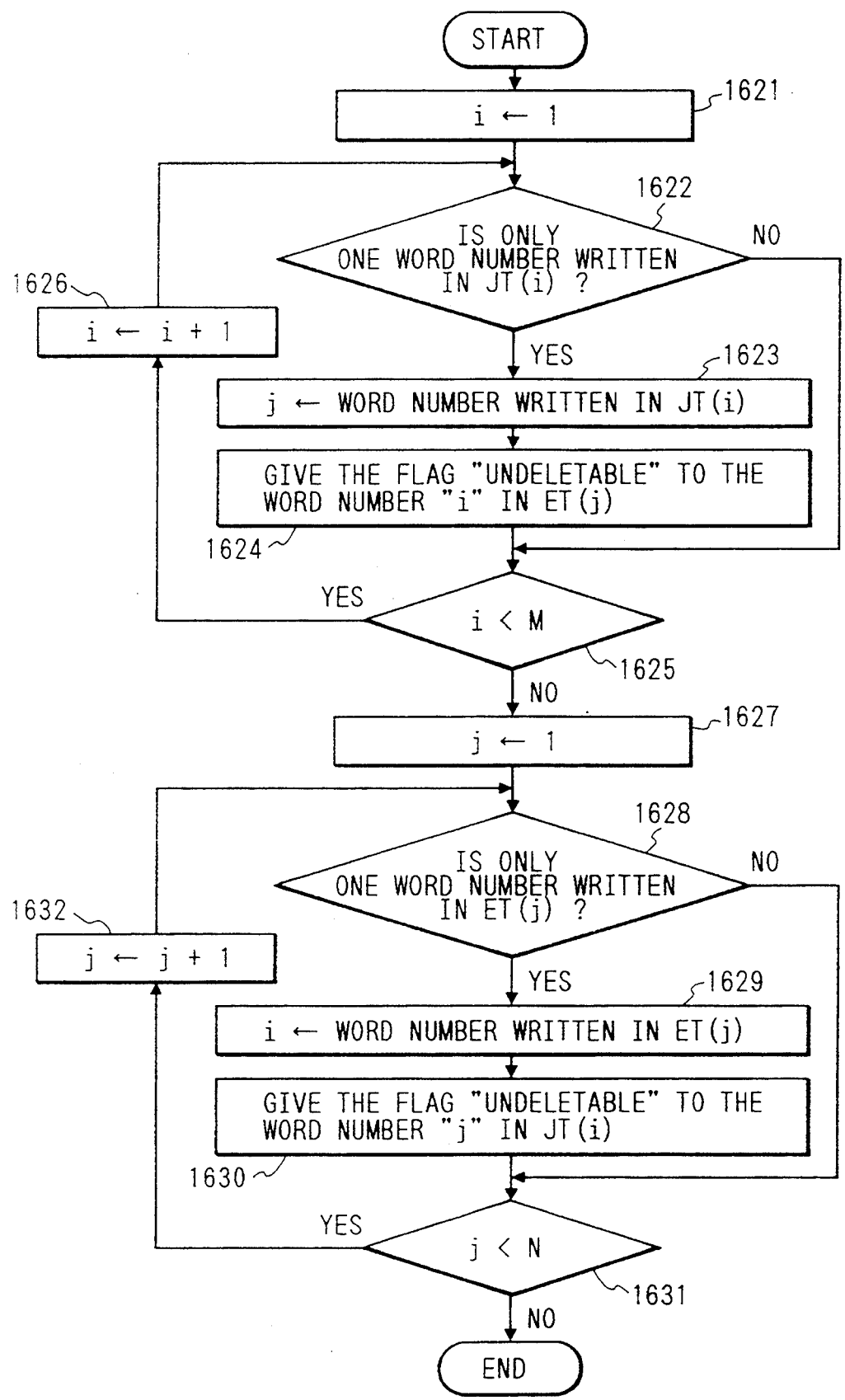
FIG. 18 is a flow chart of the undeletable word correspondence candidate extraction of the word correspondence between pair of sentences identification step.

Next, the processing for selecting candidate word correspondence, wherein either of the Japanese word and the English word does not relate to the other candidate word correspondences, from the extracted candidate word correspondences as undeletable candidate word correspondences will be explained with reference to the flow chart shown in FIG. 18. Firstly, an initial value '1' is set to an index i indicating a word of the Japanese sentence (Step 1621). When only one word number is written in the corresponding word number JT(i) of the Japanese morphological analysis table 21 (Step 1622), the value is set to the index j (Step 1623) and flag "undeletable" is given to the word number "i" in the corresponding word number ET(j) of the English morphological analysis table 22 (Step 1624). When the index i is smaller than M, i.e. the number of words of the Japanese sentence (Step 1625), 1 is added to the index i (Step 1626) and the processing of Steps 1622 to 1624 is repeated.

When the index i is equal to M, i.e. the number of words of the Japanese sentence (Step 1625), an initial value '1' is set to an index j indicating a word of the English sentence (Step 1627). Next, when only one word number is written in the corresponding word number ET(j) of the English morphological analysis table 22 (Step 1628), the value is set to the index i (Step 1629) and flag "undeletable" is given to the word number "j" in the corresponding word number JT(i) of the Japanese morphological analysis table 21 (Step 1630). When the index j is smaller than N, i.e. the number of words of the English sentence (Step 1631), 1 is added to the index j (Step 1632) and the processing of Steps 1628 to 1630 is repeated. When the index j is equal to the N, i.e. number of words of the English sentence (Step 1631), the processing ends.

Figure 19:
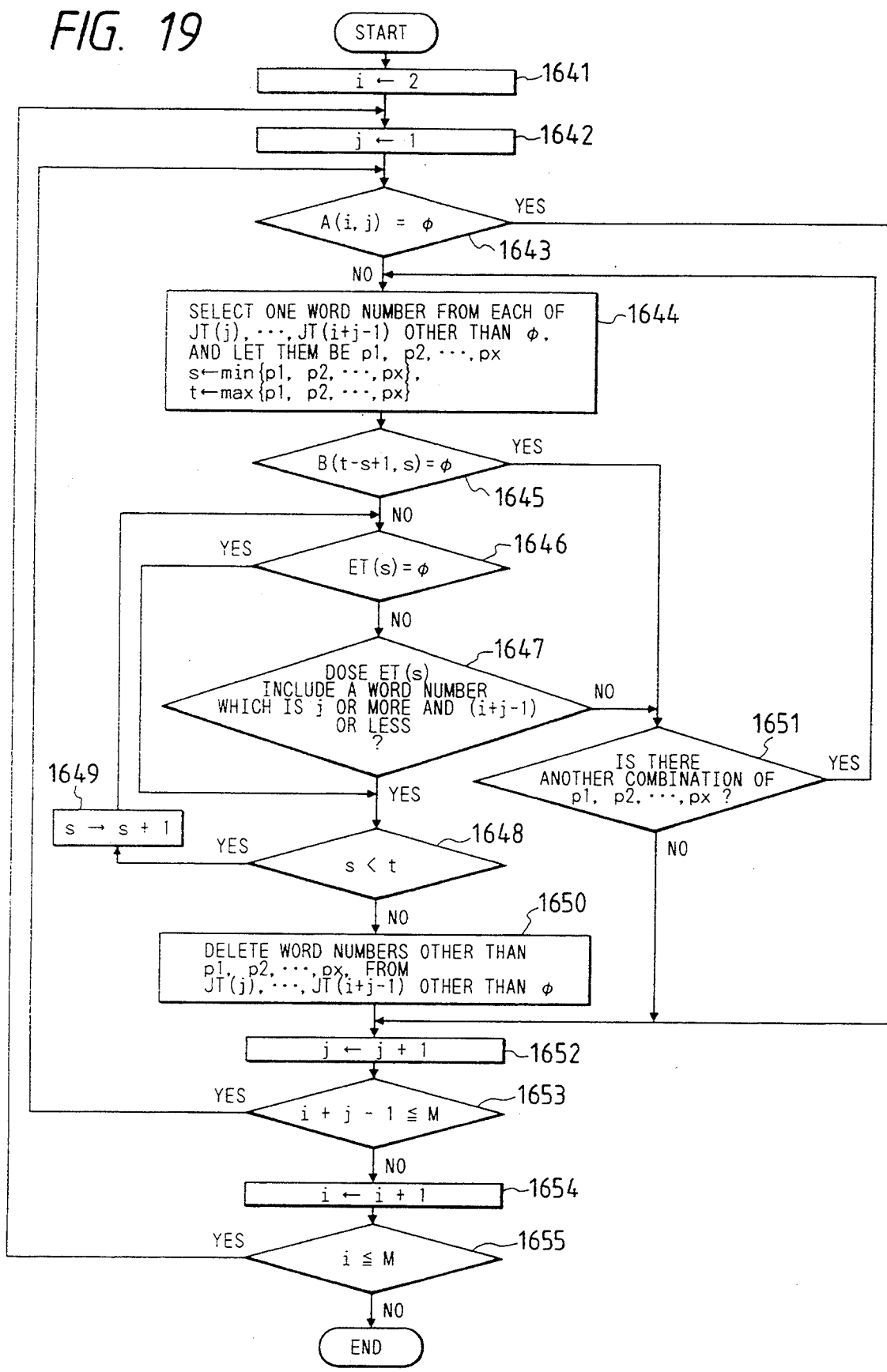
FIG. 19 is a flow chart of the word correspondence ambiguity resolution of the word correspondence between pair of sentences identification step.

Next, the processing for resolving the ambiguity of word correspondence between the Japanese sentence and the English sentence will be explained with reference to the flow chart shown in FIG. 19. Firstly, an initial value '2' is set to an index i indicating a row in the Japanese phrase analysis table 23 (Step 1641). An initial value '1' is set to an index j indicating a column in the Japanese phrase analysis table 23 (Step 1642). Next, whether the element A(i,j) is empty or not is checked (Step 1643). When the element A(i,j) is empty, the processing branches to Step 1652. When the element A(i,j) is not empty, the processing for resolving the ambiguity of word correspondence with regard to the phrase containing the "j"th through "i+j−1"th words of the Japanese sentence is executed (Steps 1644 to 1651).

Word numbers are selected one by one from the corresponding word numbers JT(j), - - - , and JT(i+j−1) in the Japanese morphological analysis table 21 which are not empty, and they are taken as p1, p2, - - - , and px, and the minimum value and maximum value of p1, p2, - - - , px! are set to variables s and t respectively (Step 1644). Next, whether the element B(t−s+1,s) is empty or not is checked (Step 1645).

When the element B(t−s+1, s) is empty, the processing branches to Step 1651. When the element B(t−s+1,s) is not empty, the corresponding word numbers ET(s), - - - , and ET(t) of the English morphological analysis table 22 are checked; that is, whether the corresponding word number ET(s) is empty or not is checked (Step 1646). When the corresponding word number ET(s) is not empty (Step 1646), whether the corresponding word number ET(s) contains a word number between j and i+j−1 or not is checked (Step 1647). When the corresponding word number ET(s) is empty (Step 1646) or contains a word number between j and i+j−1 (Step 1647), whether the variable s is smaller than the variable t or not is checked (Step 1648). When the variable s is smaller than the variable t (Step 1648), 1 is added to the variable s (Step 1649) and the step is returned to the processing for checking the corresponding word number ET(s) of the English morphological analysis table 22 (Steps 1646 and 1647).

When the variable s is equal to the variable t (Step 1648), word numbers other than p1, p2, - - -, and px are deleted from the corresponding word numbers JT(j), - - -, and JT(i+j−1) of the Japanese morphological analysis table 21 which are not empty respectively (word numbers which are not p1, p2, - - -, and px but are given flag "undeletable" are not deleted) (Step 1650).

Next, 1 is added to the index j (Step 1652) and when i+j−1 is not larger than M, i.e. the number of words of the Japanese sentence (Step 1653), the processing of Step 1643 and the subsequent steps is executed for the updated index j.

When the corresponding word number ET(s) of the English morphological analysis table 22 is not empty (Step 1646) and does not contain the word numbers between the j and i+j−1 (Step 1647), another combination of p1, p2, - - -, and px is selected (Step 1651) and the processing for resolving the ambiguity of word correspondence with regard to the phrase containing the "j"th through "i+j−1"th words of the Japanese sentence is executed (Steps 1644 to 1650). When there is no new combination of p1, p2, - - -, and px (Step 1651), 1 is added to the index j (Step 1652) and when i+j−1 is not larger than M, i.e. the number of words of the Japanese sentence (Step 1653), the processing of Steps 1643 to 1651 is executed for the updated index j.

When i+j−1 is larger than M, i.e. the number of words of the Japanese sentence (Step 1653), 1 is added to the index i (Step 1654). When i+j−1 is not larger than M, i.e. the number of words of the Japanese sentence (Step 1655), the processing of Steps 1642 to 1653 is executed for the updated index i. When the index i exceeds M, i.e. the number of words of the Japanese sentence (Step 1655), the processing ends.

Figure 20:
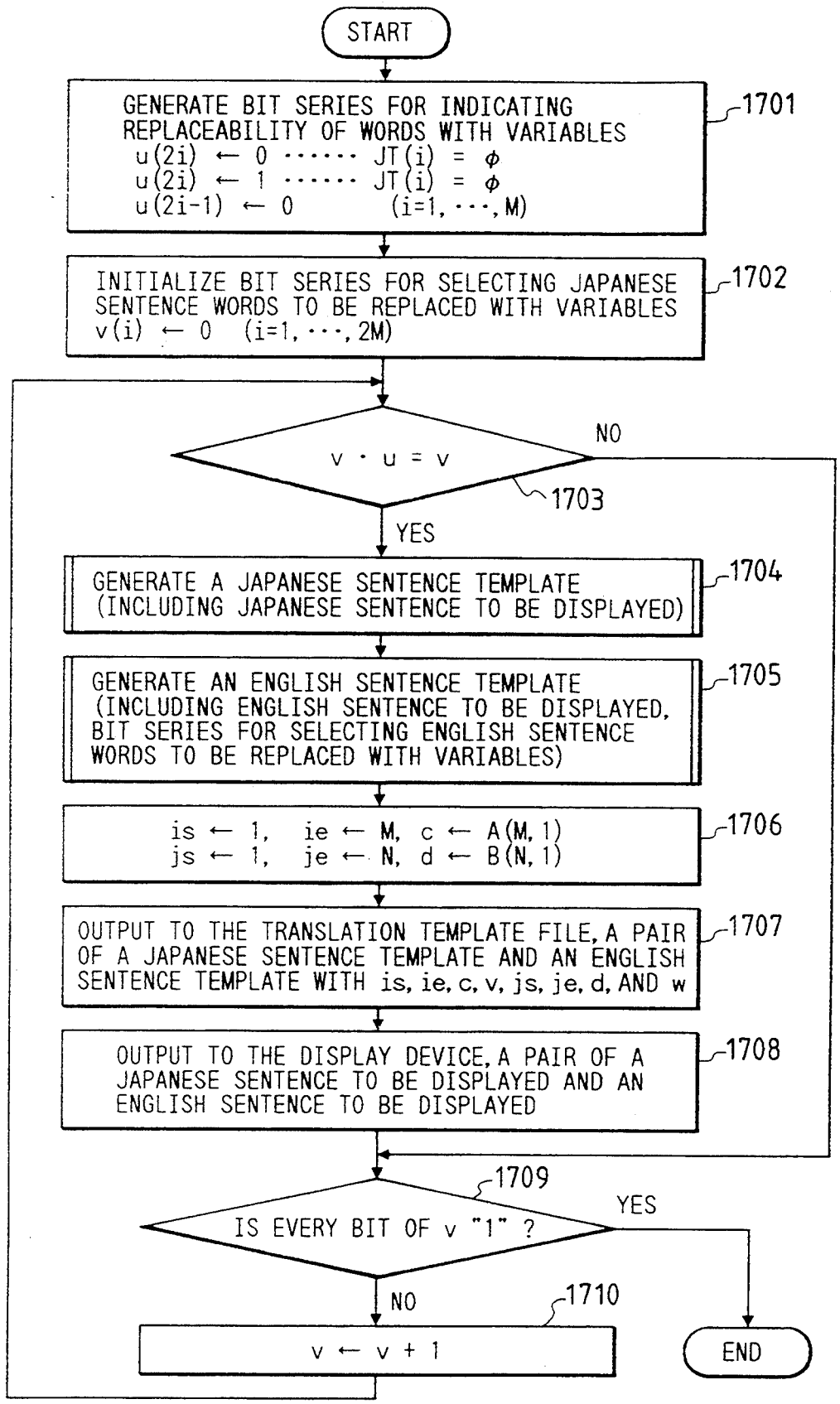
FIG. 20 is a flow chart of the processing of the translation template generation step.

Next, the processing of the translation template generation step 17 will be explained with reference to the flow chart shown in FIG. 20. This step uses a bit series indicating replaceability of Japanese sentence words with variables (u). The length of the bit series (u) 2×M. When the "2i"th bit u (2i) is 1, it indicates that the "i"th word of the Japanese sentence can be replaced with a variable and when the "2i"th bit u (2i) is 0, it indicates that the "i"th word of the Japanese sentence cannot be replaced with a variable. The "2i−1"th bit u (2i−1) is fixed to 0.

In the translation template generation step 17, the bit series (u) indicating replaceability of Japanese sentence words with variables is created as follows:

When the corresponding word number JT(i) of the Japanese morphological analysis table 21 is empty, 0 is set to the "2i"th bit u (2i). When the corresponding word number JT(i) of the Japanese morphological analysis table 21 is not empty, 1 is set to the "2i"th bit u (2i). Furthermore, 0 is set to the "2i−1"th bit u (2i−1) (i=1, - - -, M) (Step 1701). Next, all the bits are set to 0 as an initial value '0' is set to all the bits of the bit series for selecting Japanese sentence words to be replaced with variables (v) (Step 1702).

Next, whether v·u is equal to v or not is checked (Step 1703). In this case, product operation of the bit series v and u is logical AND for each bit. Only when v·u=v, Steps 1704 to 1708 are executed. A Japanese sentence template wherein words whose corresponding bits in the bit series v are 1 are replaced with variables is created (a Japanese sentence for display is also created) (Step 1704) and the English sentence template corresponding to the above Japanese sentence template is created (an English sentence for display and the bit series for selecting English sentence words to be replaced with variables (w) are also created) (Step 1705). Steps 1704 and 1705 will be explained later in detail.

Next, 1 is set to the Japanese sentence template start position (is), the value of M, i.e. the number of words of the Japanese sentence to the Japanese sentence template end position (ie), the element A(M,l) to the Japanese sentence template phrase catagory (c), 1 to the English sentence template start position (js), the value of N, i.e. the number of words of the English sentence to the English sentence template end position (je), and the element B(N,l) to the English sentence template phrase category (d) respectively (Step 1706). Next, a pair of the Japanese sentence template and English sentence template is outputted to the translation template file 34 together with the Japanese sentence template start position (is), the Japanese sentence template end position (ie), the Japanese sentence template phrase category (c), the bit series for selecting Japanese sentence words to be replaced with variables (v), the English sentence template start position (js), the English sentence template end position (je), the English sentence template phrase category (d), and the bit series for selecting English sentence words to be replaced with variables (w) (Step 1707). Furthermore, a pair of the Japanese sentence for display and English sentence for display is outputted to the display device 5 (Step 1708).

Next, whether the bits of the bit series v are all 1 or not is checked (Step 1709). When the bits of the bit series v are all 1, the processing ends. When all the bits of the bit series v are not 1, 1 is added to the bit series v by a binary operation (Step 1710) and the step is returned to the processing for checking whether v·u=v (Step 1703).

An example pair of the Japanese sentence for display and English sentence for display which is outputted to the display device 5 by Step 1708 indicated in the above description of the translation template generation step 17 is shown in FIG. 21(a). The translation template which corresponds to it is shown in FIG. 5(a).

Figure 22:
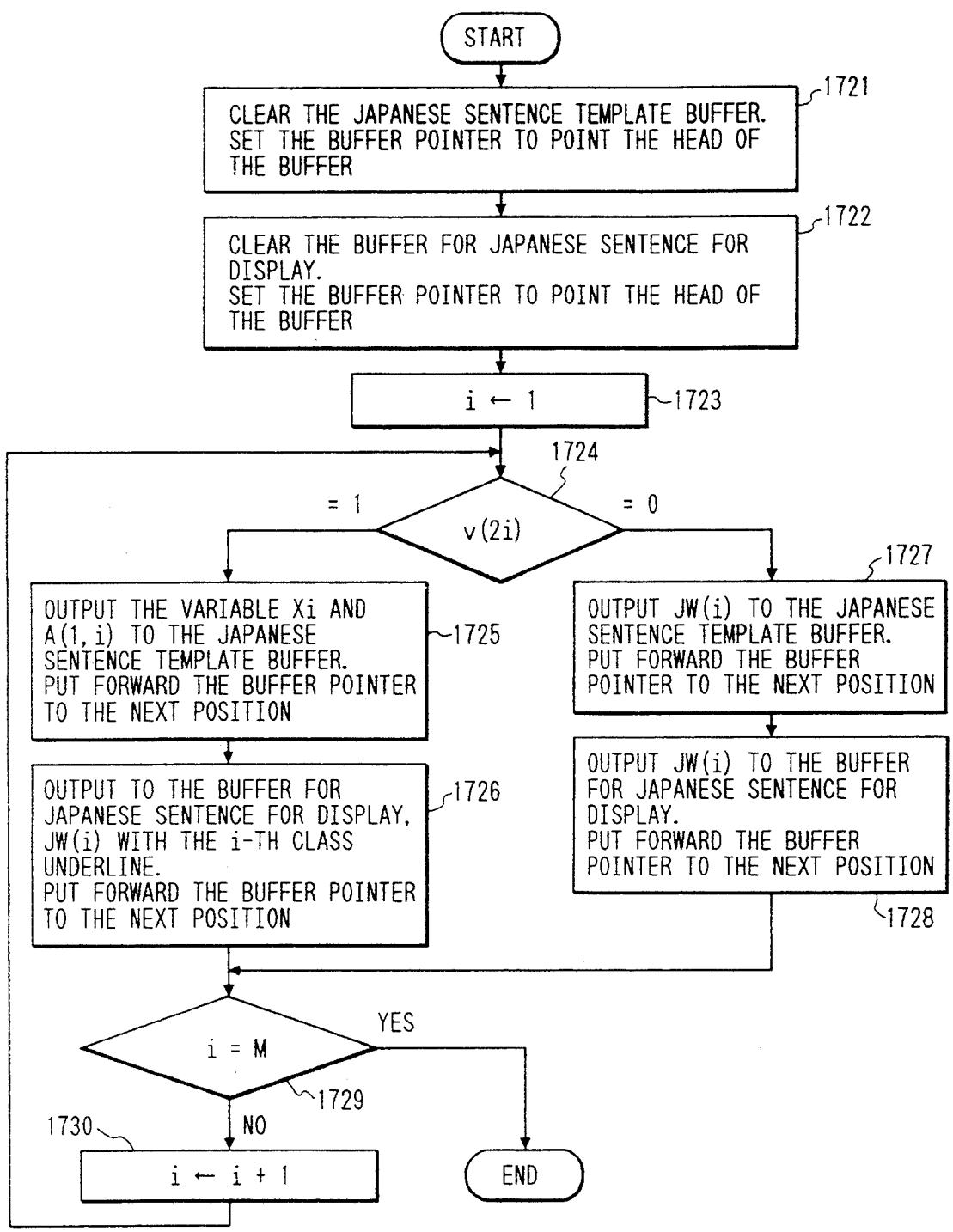
FIG. 22 is a flow chart of the Japanese sentence template creation of the translation template generation step.

Next, creation of a Japanese sentence template (Step 1704) will be explained in detail with reference to the flow chart shown in FIG. 22. Firstly, the Japanese sentence template buffer is cleared and the buffer pointer for indicating the data output position in the buffer is set so as to point the head of the buffer (Step 1721). Next, the buffer for Japanese sentence buffer for display is cleared and the buffer pointer for indicating the data output position in the buffer is set so as to point the head of the buffer (Step 1722). Next, an initial value '1' is set to an index i indicating a word of the Japanese sentence (Step 1723).

Furthermore, whether the "2i"th bit v (2i) of the bit series for selecting Japanese sentence words to be replaced with variables is 1 or 0 is checked (Step 1724). When the bit v (2i) is 1 (Step 1724), the variable Xi and the element A(l,i) of the 1st row and "i"th column of the Japanese phrase analysis table 23 are outputted to the Japanese sentence template buffer and the buffer pointer is put forward to point the next position (Step 1725). Furthermore, the "i"th occurred form JW(i) of the Japanese morphological analysis table 21 with an "i"th class underline is outputted to the buffer for Japanese sentence for display and the buffer pointer is put forward to point the next position (Step 1726).

The "i"th class underline is an indication of the part of the Japanese sentence which is to be replaced with the "i"th variable. The "i"th class means that the color or form of the underline may be changed or other indication may be used instead of the underline. As described later, the same "i"th class underline is set also to the part of the English sentence which is to be replaced with the "i"th variable.

When the bit v (2i) is 0 (Step 1724), the "i"th occurred form JW(i) of the Japanese morphological analysis table 21 is outputted to the Japanese sentence template buffer and the buffer pointer is put forward to point the next position (Step 1727). Furthermore, the "i"th occurred form JW(i) of the Japanese morphological analysis table 21 is outputted to the buffer for Japanese sentence for display and the buffer pointer is put forward to point the next position (Step 1728).

When the index i is not equal to M, i.e. the number of words of the Japanese sentence after Step 1726 or 1728 is executed (Step 1729), 1 is added to the index i (Step 1730) and the step is returned to the processing for checking whether the bit v (2i) is 1 or 0 (Step 1724). When the index i is equal to M, i.e. the number of words of the Japanese sentence (Step 1729), the Japanese sentence template creation ends.

Figure 23:
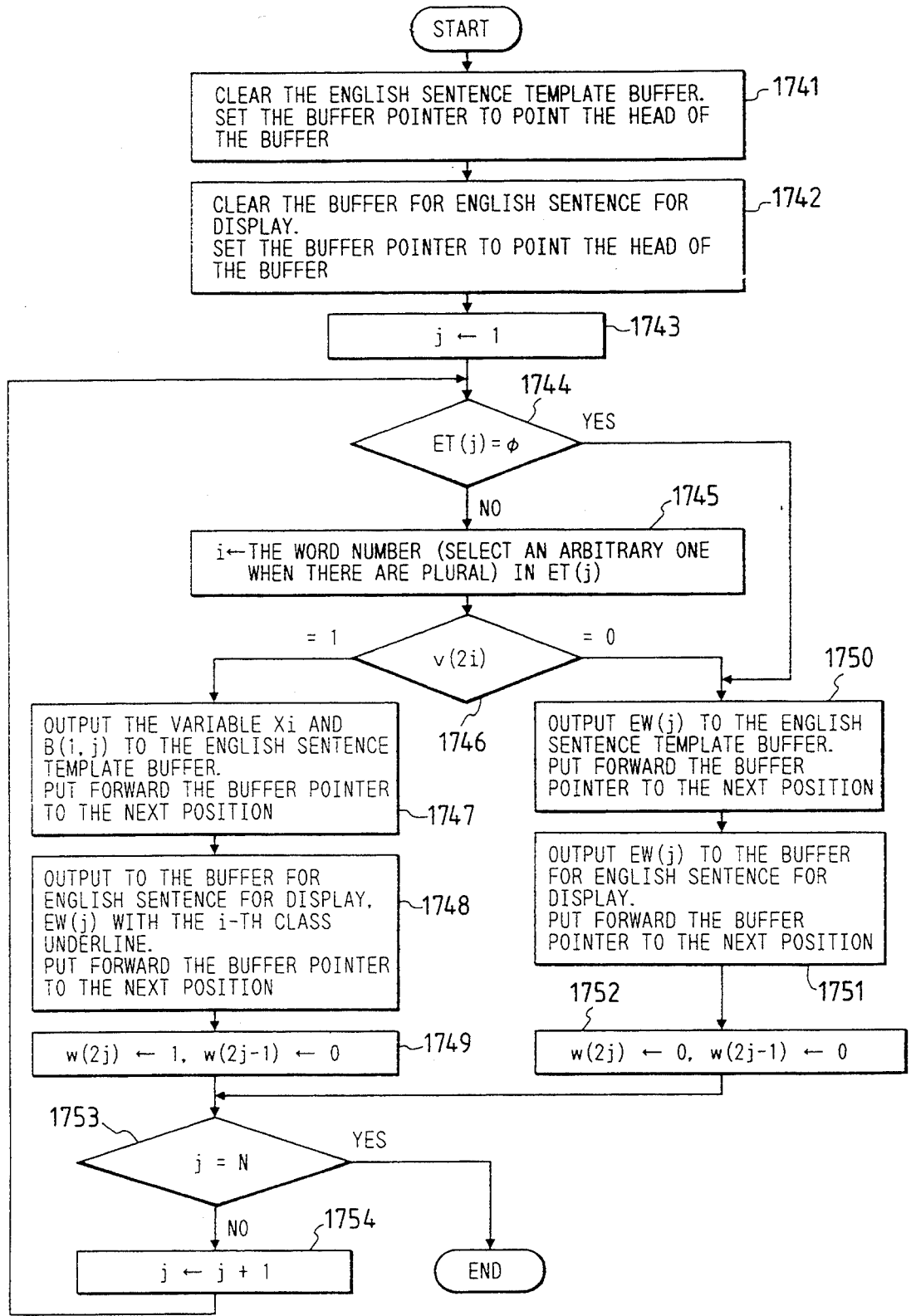
FIG. 23 is a flow chart of the English sentence template creation of the translation template generation step.

Next, creation of an English sentence template (Step 1705) will be explained in detail with reference to the flow chart shown in FIG. 23. Firstly, the English sentence template buffer is cleared and the buffer pointer for indicating the data output position in the buffer is set so as to point the head of the buffer (Step 1741). Next, the buffer for English sentence for display is cleared and the buffer pointer for indicating the data output position in the buffer is set so as to point the head of the buffer (Step 1742).

Next, an initial value '1' is set to an index j indicating a word of the English sentence (Step 1743). Whether the "j"th corresponding word number ET(j) of the English morphological analysis table 22 is empty or not is checked (Step 1744). When the corresponding word number ET(j) is empty, the "j"th occurred form EW(j) of the English morphological analysis table 22 is outputted to the English sentence template buffer and the buffer pointer is put forward to point the next position (Step 1750). Next, the "j"th occurred form EW(j) of the English morphological analysis table 22 is outputted to the buffer for English sentence for display and the buffer pointer is put forward to point the next position (Step 1751). Furthermore, 0 is set to the "2j"th bit w (2j) of the bit series for selecting English sentence words to be replaced with variables and 0 is set also to the "2j−1"h bit w (2j−1) (Step 1752).

When the "j"th corresponding word number ET(j) of the English morphological analysis table 22 is not empty (Step 1744), the word number in the corresponding word number ET(j), (when a plurality of word numbers are contained in ET(j), an optional one is selected) is set to the index i (Step 1745) and whether the "2i"th bit v (2i) of the bit series for selecting Japanese sentence words to be replaced with variables is 1 or 0 is checked (Step 1746).

When the bit v (2i) is 1 (Step 1746), the variable Xi and the element B(l,j) of the 1st row and "j"th column of the English phrase analysis table 24 are outputted to the English sentence template buffer and the buffer pointer is put forward to point the next position (Step 1747). Next, the "j"th occurred form EW(j) of the English morphological analysis table 22 with an "i"th class underline is outputted to the English sentence buffer for display and the buffer pointer is put forward to point next position (Step 1748). Furthermore, 1 is set to the "2j"th bit w (2j) of the bit series for selecting English sentence words to be replaced with variables and 0 is set to the ¢2j−1"th bit w (2j−1) (Step 1749).

When the bit v (2i) is 0 (Step 1746), the "j"th occurred form EW(j) of the English morphological analysis table 22 is outputted to the English sentence template buffer and the buffer pointer is put forward to point the next position (Step 1750). Next, the "j"th occurred form EW(j) of the English morphological analysis table 22 is outputted to the buffer for English sentence for display and the buffer pointer is put forward to point the next position (Step 1751). Furthermore, 0 is set to the "2j"th bit w (2j) of the bit series for selecting English sentence words to be replaced with variables and 0 is set also to the ¢2j−1"th bit w (2j−1) (Step 1752).

When the index j is not equal to N, i.e. the number of words of the English sentence after Step 1749 or 1752 is executed (Step 1753), 1 is added to the index j (Step 1754) and the step is returned to the processing for checking whether the "j"th corresponding word number ET(j) of the English morphological analysis table 22 is empty (Step 1744). When the index j is equal to the N, i.e. the number of words of the English sentence (Step 1753), the English sentence template creation ends.

Figure 24:
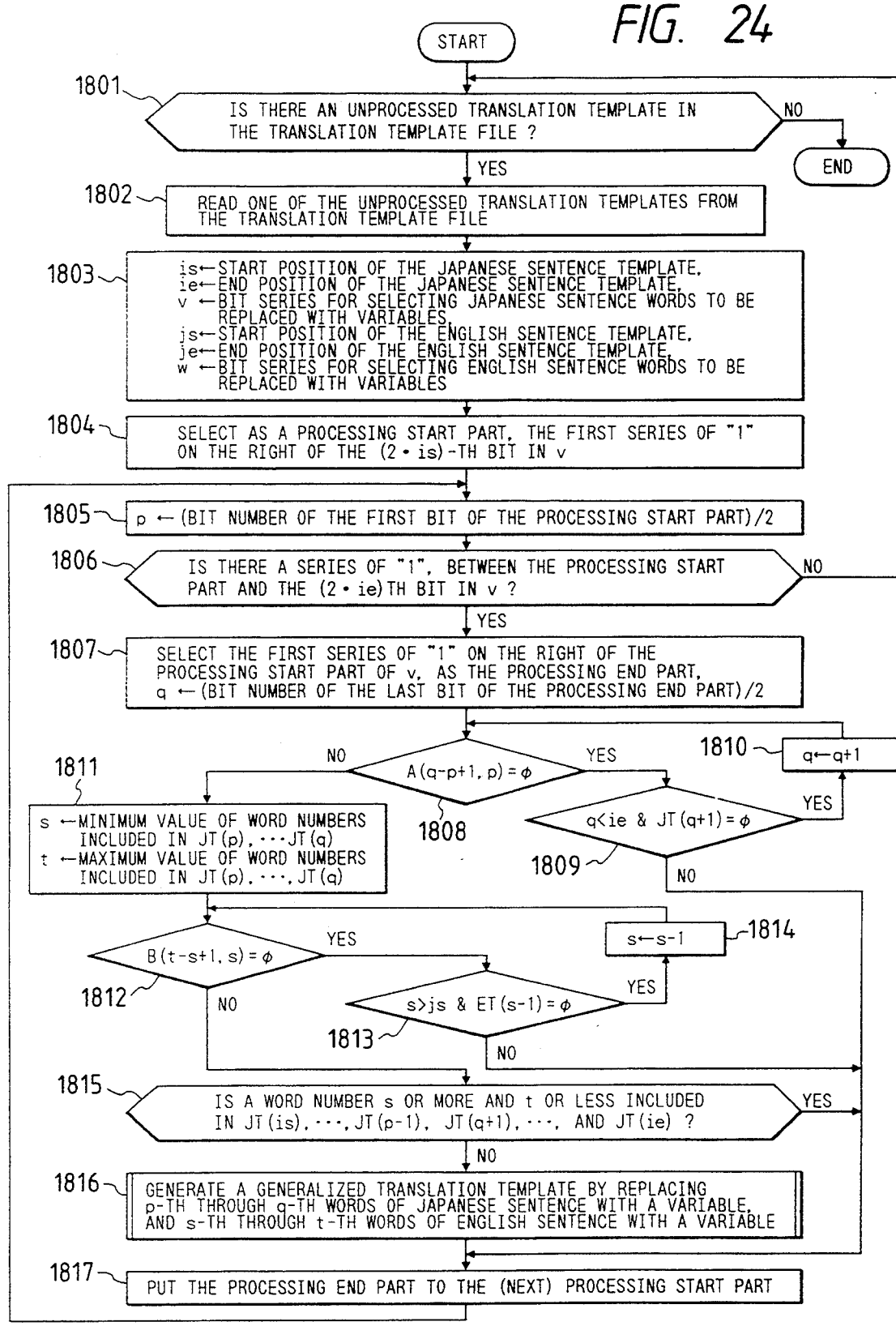
FIG. 24 is a flow chart of the processing of the translation template generalization step.

Next, the processing of the following translation template generalization step 18 will be explained with reference to the flow chart shown in FIG. 24. The translation template generalization processing is repeated until translation templates whereto the following translation template generalization processing has not been applied disappear from the translation template file 34 (Step 1801).

Firstly, an unprocessed translation template is read from the translation template file 34 (Step 1802). The Japanese sentence template start position of the read translation template is set to a variable is, the Japanese sentence template end position to a variable ie, the bit series for selecting Japanese sentence words to be replaced with variables to a bit series v, the English sentence template start position to a variable js, the English sentence template Japanese sentence template end position to a variable je, and the bit series for selecting English sentence words to be replaced with variables to a bit series w (Step 1803). The first series of "1" (of at least one bit) on the right of the "2·is"th bit in the bit series v is selected as a processing start part (Step 1804). Next, (bit number of the first bit of the processing start part)/2 is set to p (Step 1805). whether there is a series of "1" between the processing start part and the "2·ie"th bit in the bit series v or not is checked (Step 1806). When there is not a series of "1" between the processing start part and the "2·ie"th bit in the bit series v, the processing is returned to Step 1801.

When there is a series of "1" between the processing start part and the "2·ie"th bit in the bit series v, the first series of "1" is selected as a processing end part and (bit number of the last bit of the processing end part)/2 is set to q (Step 1807). Next, whether the element A(q−p+1,p) is empty or not is checked (Step 1808). When the element A(q−p+1,p) is empty (Step 1808), whether q is smaller than the end position ie and the corresponding word number JT(q+1) in the Japanese morphological analysis talbe 21 is empty or not is checked (Step 1809). When q is smaller than the Japanese sentence template end position ie and the corresponding word number JT(q+1) is empty, 1 is added to q (Step 1810) and the step is returned to the processing for checking the element A(q−p+1,p) (Step 1808). When q is not smaller than the end position ie or the corresponding word number JT(q+1) is not empty, the processing end part is set to the processing start part (Step 1817) and the processing is returned to Step 1805.

When the element A(q−p+1,p) is not empty (Step 1808), the minimum value and maximum value of the word numbers contained in the corresponding word numbers JT(p), ---, and JT(q) of the Japanese morphological analysis table 21 are set to s and t respectively (Step 1811) and whether the element B(t−s+1,s) is empty or not is checked (Step 1812). When the element B(t−s+1,s) is empty (Step 1812), whether s is larger than the English sentence template start position js and the corresponding word number ET(s−1) in the English morphological analysis table 22 is empty or not is checked (Step 1813). When s is larger than the start position js and the corresponding word number ET(s−1) is empty, 1 is subtracted from s (Step 1814) and the step is returned to the processing for checking the element B(t−s+1,s) (Step 1812). When s is not larger than the start position js or the corresponding word number ET(s−1) is not empty, the processing end part is set to the processing start part (Step 1817) and the processing is returned to Step 1805.

When the element B(t−s+1,s) is not empty (Step 1812), whether a word number between s and t is contained in one of the corresponding word numbers JT(is), ---, and JT(p−1) and JT(q+1), ---, and JT(ie) of the Japanese morphological analysis table 21 or not is checked (Step 1815). When a word number between s and t is contained in one of the corresponding word numbers JT(is), . . . , and JT(p−1) and JT(q+1), . . . , and JT(ie), the processing end part is set to the processing start part (Step 1817) and the processing is returned to Step 1805. When such a word number is not contained, a generalized translation template wherein both the part of the "p"th through "q"th words of the Japanese sentence and the part of the "s"th through "t"th words of the English sentence are replaced with an identical variable is created (Step 1816). Next, the processing end part is set to the processing start part (Step 1817) and the processing is returned to Step 1805.

Figure 25:
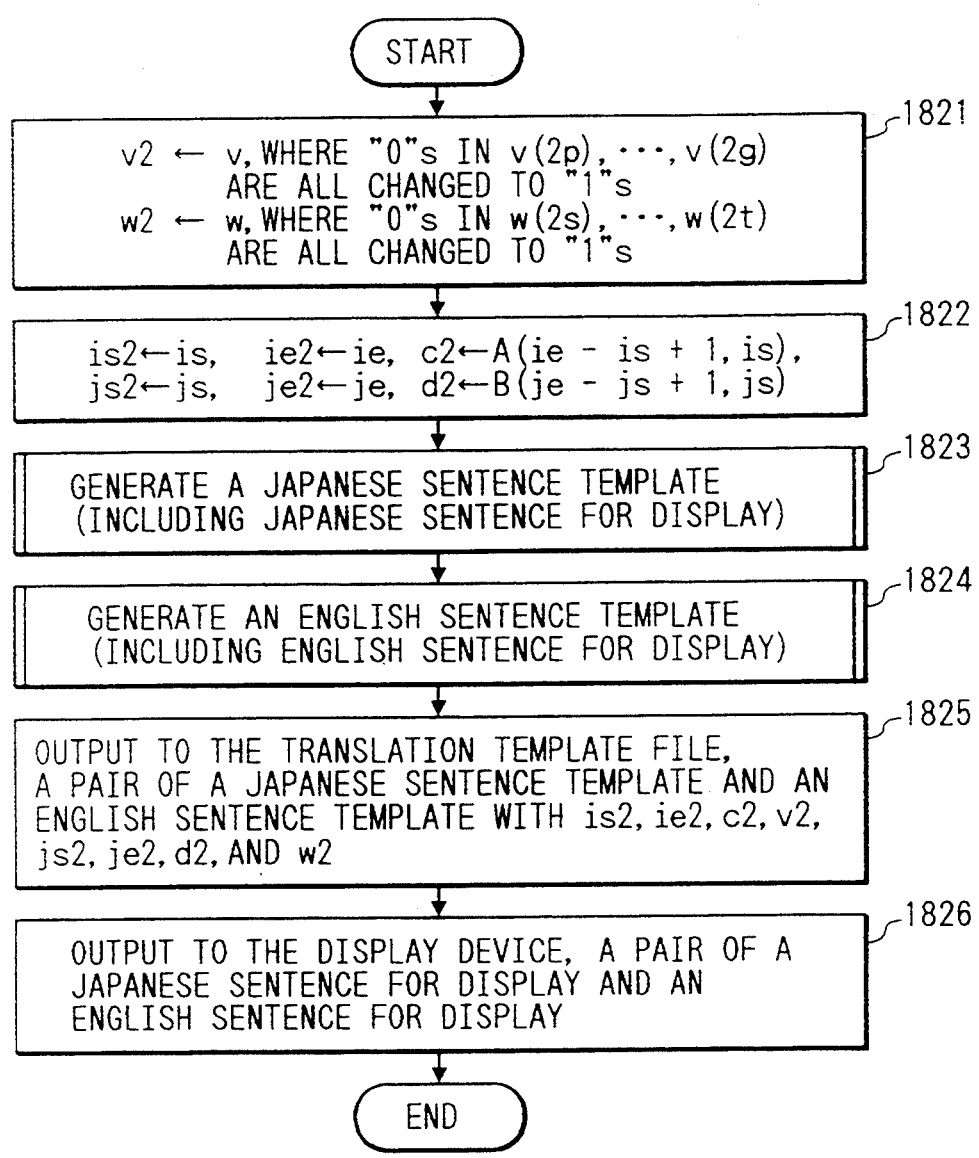
FIG. 25 is a flow chart of the generalized translation template creation of the translation template generalization step.

Next, details of the processing for creating a generalized translation template wherein both the part of the "p"th through "q"th words of the Japanese sentence and the part of the "s"th through "t"th words of the English sentence are replaced with an identical variable (Step 1816) will be explained with reference to the flow chart shown in FIG. 25. Firstly, the bit series v wherein the bits of 0 between the "2p"th bit and the "2q"th bit are all changed to bits of 1 is set to the second bit series for selecting Japanese sentence words to be replaced with variables v2 and the bit series w wherein the bits of 0 between the "2s"th bit and the "2t"th bit are all changed to bits of 1 is set to the second bit series for selecting English sentence words to be replaced with variables (w2) (Step 1821). Next, the Japanese sentence template start position (is) is set to the second Japanese sentence template start position (is2), the Japanese sentence template end position (ie) to the second Japanese sentence template end position (ie2), the element A(ie−is+1,is) to the second Japanese sentence template phrase category (c2), the English sentence template start position (js) to the second English sentence template start position (js2), the English sentence template end position (je) to the second English sentence template end position (je2), and the element B(je−js+1,js) to the second English sentence template phrase category (d2) respectively (Step 1822).

Next, a Japanese sentence template and a Japanese sentence for display are created (Step 1823) and an English sentence template and an English sentence for display are created (Step 1824). Steps 1823 and 1824 will be explained later in detail. Next, a pair of the Japanese sentence template and English sentence template is outputted to the translation template file 34 together with the second Japanese sentence template start position (is2), the second Japanese sentence template end position (ie2), the second Japanese sentence template phrase category (c2), the second bit series for selecting Japanese sentence words to be replaced with variables (v2), the second English sentence template start position (js2), the second English sentence template end position (je2), the second English sentence template phrase category (d2), and the second bit series for selecting English sentence words to be replaced with variables (w2) (Step 1825). Finally, a pair of the Japanese sentence for display and English sentence for display is outputted to the display device 5 (Step 1826).

An example pair of the Japanese sentence for display and English sentence for display which is displayed on the display device 5 by Step 1826 is shown in FIG. 21(*b*). The translation template which corresponds to it is shown in FIG. 5(*b*).

Figure 26:
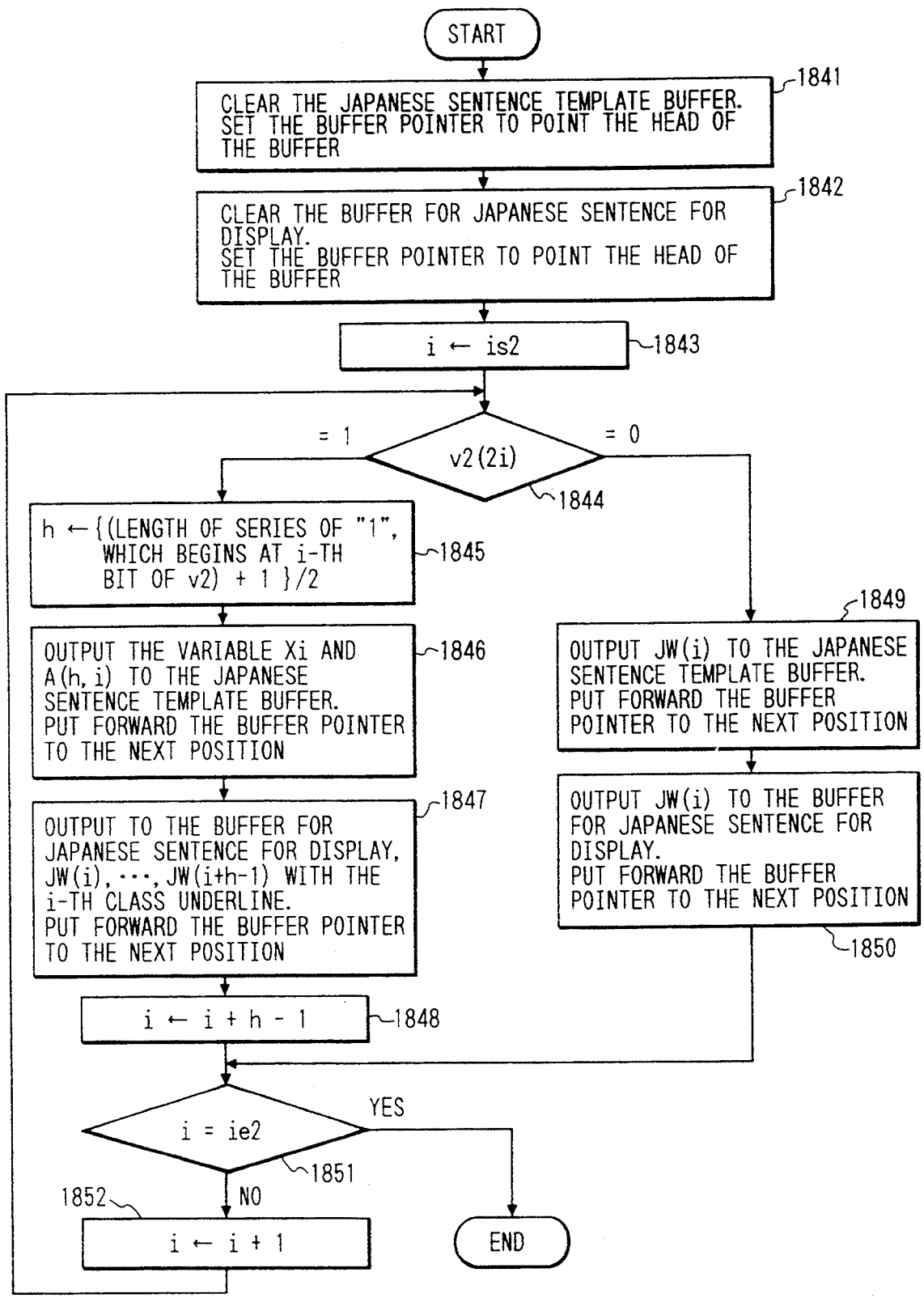
FIG. 26 is a flow chart of the Japanese sentence template creation of the translation template generalization step and partial translation template generation step.

Next, the processing of creation of a Japanese sentence template (Step 1823) will be explained in detail with reference to the flow chart shown in FIG. 26. Firstly, the Japanese sentence template buffer is cleared and the buffer pointer for indicating the data output position in the buffer is set so as to point the head of the buffer (Step 1841). Next, the buffer for Japanese sentence buffer for display is cleared and the pointer for indicating the data output position in the buffer is set so as to point the head of the buffer (Step 1842). Next, the value of is2 is set to an index i indicating a word of the Japanese sentence template (Step 1843).

Next, when the "2i"th bit v2 (2i) of the second bit series for selecting Japanese sentence words to be replaced with variables is 1 (Step 1844), (length of series of "1" which begins at "2i"th bit of v2)+1/2 is set to an index h (Step 1845), and the variable Xi and the element A(h,i) of the "h"th row and "i"th column of the Japanese phrase analysis table 23 are outputted to the Japanese sentence template buffer, and the buffer pointer is put forward to point the next position (Step 1846). Next, the "i"th through "i+h−1"th occurred forms JW(i), ---, and JW(i+h−1) of the Japanese morphological analysis table 21 with an "i"th class underline are outputted to the buffer for Japanese sentence for display and the buffer pointer is put forward to point the next position (Step 1847). Furthermore, h−1 is added to the index i (Step 1848).

When the "2i"th bit v2 (2i) of the second bit series for selecting Japanese sentence words to be replaced with variables is 0 (Step 1844), the "i"th occurred form JW(i) of the Japanese morphological analysis table 21 is outputted to the Japanese sentence template buffer and the buffer pointer is put forward to point the next position (Step 1849). Furthermore, the "i"th occurred form JW(i) of the Japanese morphological analysis table 21 is outputted to the buffer for Japanese sentence for display and the buffer pointer is put forward to point the next position (Step 1850).

When the index i is smaller than ie2 after Step 1848 or 1850 is executed (Step 1851), 1 is added to the index i (Step 1852) and the processing is returned to Step 1844. When the index i is equal to ie2 (Step 1851), the processing end.

Figure 27:
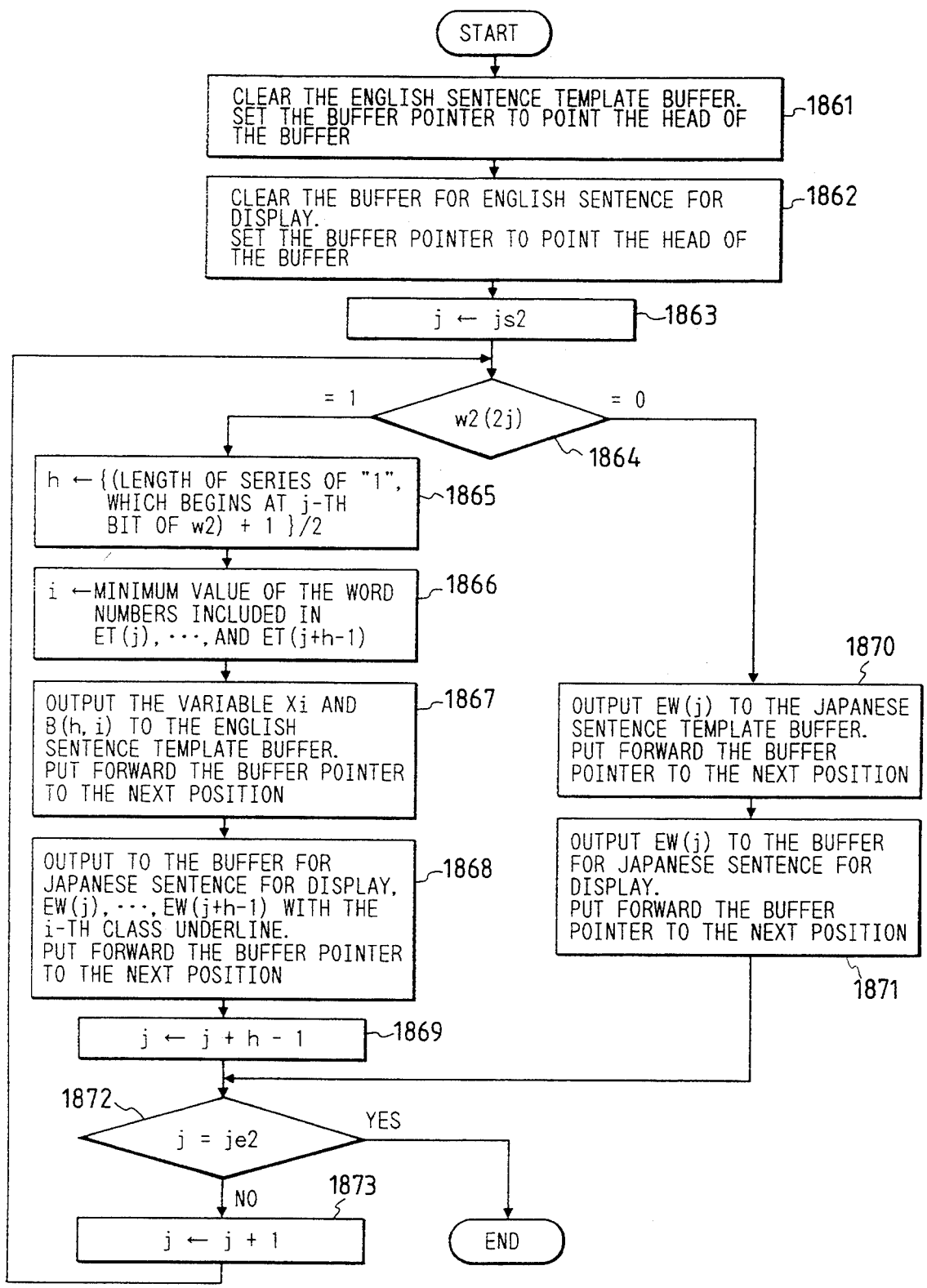
FIG. 27 is a flow chart of the English sentence template creation of the translation template generalization step and partial translation template generation step.

Next, creation of an English sentence template (Step 1824) will be explained in detail with reference to the flow chart shown in FIG. 27. Firstly, the English sentence template buffer is cleared and the buffer pointer for indicating the data output position in the buffer is set so as to point the head of the buffer (Step 1861). Next, the buffer for English sentence for display is cleared and the buffer pointer for indicating the data output position in the buffer is set so as to point the head of the buffer (Step 1862). Furthermore, the value of js2 is set to an index j indicating a word of the English sentence (Step 1863).

Next, when the "2j"th bit w2 (2j) of the second bit series for selecting English sentence words to be replaced with variables is 1 (Step 1864), {(length of series of "1" which begins at "2j"th bit of w2)+1}/2 is set to an index h (Step 1865) and the minimum value of the word numbers contained in the "j"th through "j+h−1"th corresponding word numbers ET(j), - - - , and ET(j+h−1) of the English morphological analysis table 22 is set to the index i (Step 1866).

Next, the variable Xi and the element B(h,j) of the "h"th row and "j"th column of the English phrase analysis table 24 are outputted to the English sentence template buffer and the buffer pointer is put forward to point the next position (Step 1867). Next, the "j"th through "j+h−1"th occurred forms EW(j), - - - , and EW(j+h'1) of the English morphological analysis table 22 with an "i"th class underline are outputted to the buffer for English sentence for display and the buffer pointer is put forward to point the next position (Step 1868). Furthermore, h−1 is added to the index j (Step 1869).

When the "2j"th bit w2 (2j) of the second bit series for selecting English sentence words to be replaced with variables is 0 (Step 1864), the "j"th occurred form EW(j) of the English morphological analysis table 22 is outputted to the English sentence template buffer and the buffer pointer is put forward to point the next position (Step 1870). Next, the "j"th occurred form EW(j) of the English morphological analysis table 22 is outputted to the buffer for English sentence for display and the buffer pointer is put forward to point the next position (Step 1871).

When the index j is smaller than je2 after Step 1869 or 1871 is executed (Step 1872), 1 is added to the index j (Step 1873) and the processing is returned to Step 1864. When the index j is equal to je2 (Step 1872), the processing end.

Figure 28:
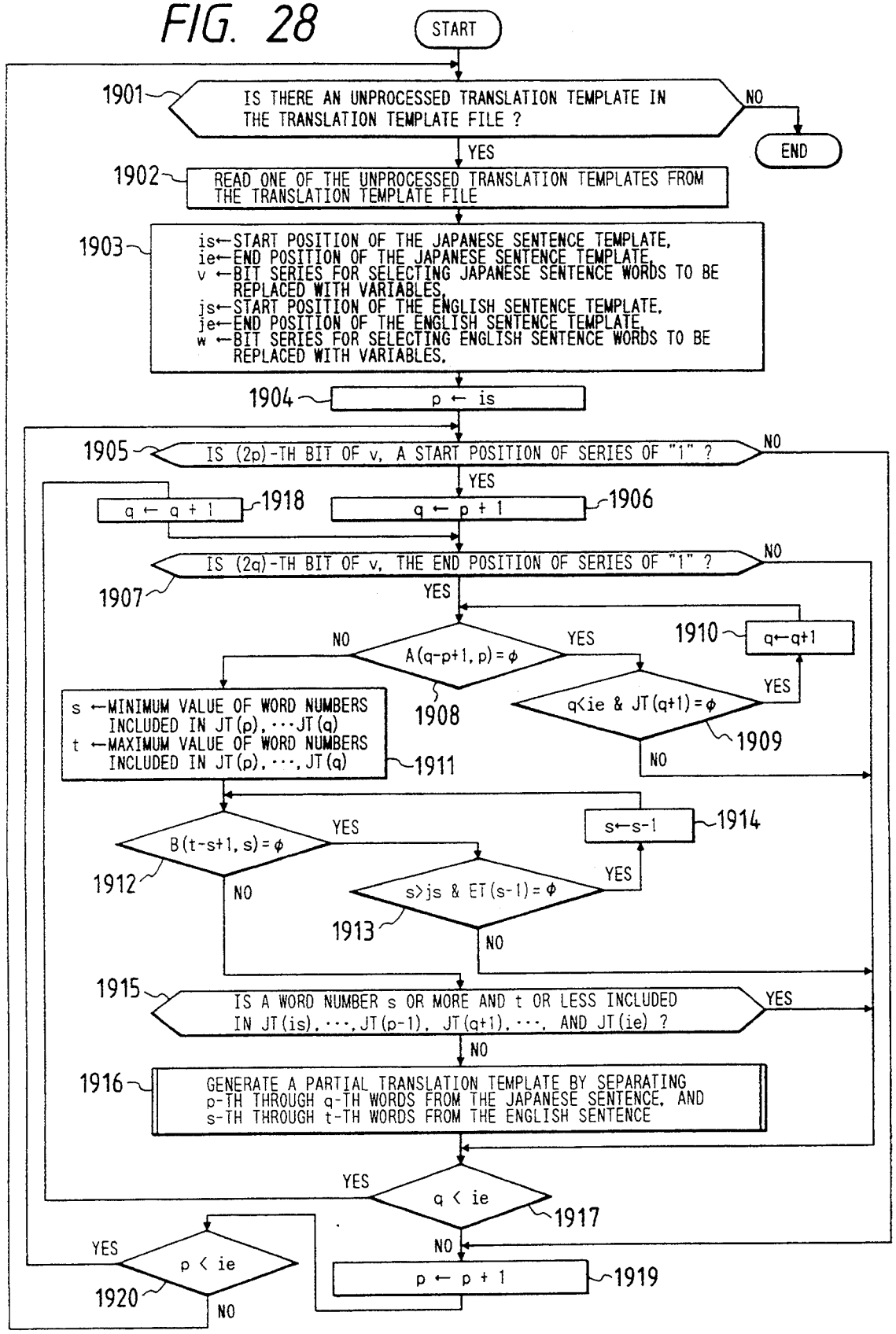
FIG. 28 is a flow chart of the processing of the partial translation template generation step.

Next, the processing of the partial translation template generation step 19 will be explained with reference to the flow chart shown in FIG. 28. The following partial translation template generation processing is repeated until translation templates whereto the partial translation template generation processing has not been applied disappear from the translation template file 34 (Step 1901).

Firstly, an unprocessed translation template is read from the translation template file 34 (Step 1902). The Japanese sentence template start position of the read translation template is set to a variable is, the Japanese sentence template end position to a vriable ie, the bit series for selecting Japanese sentence words to be replaced with variables to a bit series v, the English sentence template start position to a varialbe js, the English sentence template end position to a variable je, and the bit series for selecting English sentence words to be replaced with variables to a bit series w respectively (Step 1903). Next, the Japanese sentence template start position (is) is set to p (Step 1904).

Next, whether the "2p"th bit of the bit series v is a start position of a series of "1" or not is checked (Step 1905). When the "2p"th bit is not a start position of a series of "1" (Step 1905), the step proceeds to the processing for updating p (Step 1919). When the "2p"th bit is a start position of a series of "1" (Step 1905), p+1 is set to q (Step 1906) and whether the "2q"th bit of the bit series v is the end position of the series of "1" or not is checked (Step 19007). When the "2q"th bit is not the end position of the series of "1" (Step 1907), the step proceeds to the processing for checking whether q is smaller than ie (Step 1917).

When the "2q"th bit is the end position of the series of "1" (Step 1907), whether the element A(q−p+1,p) is empty or not is checked (Step 1908). When the element A(q−p+1,p) is empty (Step 1908), whether q is smaller than the Japanese sentence template end position ie and the corresponding word number. JT(q+1) in the Japanese morphological analysis table 21 is empty or not is checked (Step 1909). When q is smaller than the end position ie and the corresponding word number JT(q+1) is empty, 1 is added to q (Step 1910) and the step is returned to the processing for checking the element A(q−p+1,p) (Step 1908). When q is not smaller than the end position ie or the corresponding word number JT(q+1) is not empty, the step proceeds to the processing for checking whether q is smaller than ie (Step 1917).

When the element A(q−p+1,p) is not empty (Step 1908), the minimum value and maximum value of the word numbers contained in the "p"th through "q"th corresponding word numbers JT(p), - - - , and JT(q) of the Japanese morphological analysis table 21 are set to s and t respectively (Step 1911) and whether the element B(t−s+1,s) is empty or not is checked (Step 1912). When the element B(t−s+1,s) is empty (Step 1912), whether s is larger than the English sentence template start position js and the corresponding word number ET(s−1) is empty or not is checked (Step 1913). When s is larger than the start position js and the corresponding word number ET(s−1) is empty, 1 is subtracted from s Step 1914) and the step is returned to the processing for checking the element B(t−s+1,s) (Step 1912). When s is not larger than the start position js or the corresponding word number ET(s−1) is not empty, the step proceeds to the processing for checking whether q is smaller than the Japanese sentence template end position ie (Step 1917).

When the element B(t−s+1,s) is not empty (Step 1912), whether a word number between s and t is contained in one of the corresponding word numbers JT(is), - - - , and JT(p−1) and JT(q+1), - - - , and JT(ie) of the Japanese morphological analysis table 21 or not is checked (Step 1915). When a word number between s and t is contained in one of the corresponding word numbers JT(is), - - -, and JT(p−1) and JT(q+1), - - -, and JT(ie), the step proceeds to the processing for checking whether q is smaller than the Japanese sentence template end position ie (Step 1917). When such a word number is not contained, a partial translation template wherein the part of the "p"th through "q"th words of the Japanese sentence and the part of the "s"th through "t"th words of the English sentence are separated is created (Step 1916). Step 1916 will be explained later in detail.

Next, whether q is smaller than the Japanese sentence template end position ie or not is checked (Step 1917). When q is smaller than ie, 1 is added to q (Step 1918) and the step is returned to the processing for checking whether the "2q"th bit of the bit series v is the end position of the series of "1" or not (Step 1907). When q is equal to ie, 1 is added to p (Step 1919). When p is smaller than ie (Step 1920), the step is returned to the processing for checking whether the "2p"th bit of the bit series v is a start position of a series of "1" (Step 1905). When p is equal to ie (Step 1920), the step is returned to the processing for checking whether there are translation templates whereto the partial translation template generation processing has not been applied in the translation template file 34 or not (Step 1901).

Figure 29:
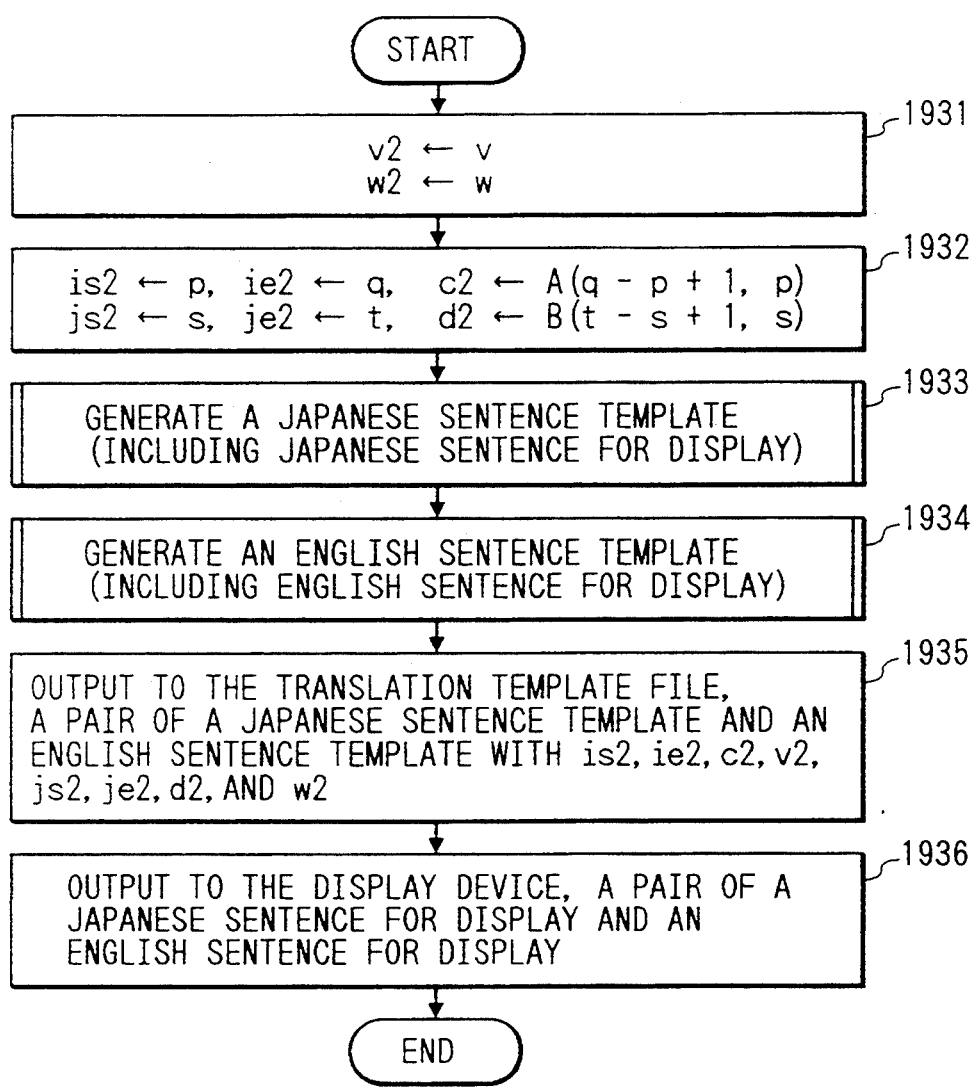
FIG. 29 is a flow chart of the partial translation template creation of the partial translation template generation step.

Next, the processing for creating a partial translation template wherein the part of the "p"th through "q"th words of the Japanese sentence and the part of the "s"th through "t"th words of the English sentence are separated will be explained in detail with reference to FIG. 29. Firstly, v is set to the second bit series for selecting Japanese sentence words to be replaced with variables (v2) and w is set to the second bit series for selecting English sentence words to be replaced with variables (w2) (Step 1931). Next, p is set to the second Japanese sentence template start position (is2), q to the second Japanese sentence template end position (ie2), the element $A(q-p+1,p)$ to the second Japanese sentence template phrase category (c2), s to the second English sentence template start position (js2), t to the second English sentence template end position (je2), and the element $B(t-s+1,s)$ to the second English sentence template phrase category (d2) respectively (Step 1932).

Next, a Japanese sentence template and a Japanese sentence for display are created (Step 1933). This processing is exactly the same as the Japanese sentence template creation 1823 (details are shown in FIG. 26) of the translation template generalization step. Next, an English sentence template and English sentence for display are created (Step 1934). This processing is exactly the same as the English sentence template creation 1824 (details are shown in FIG. 27) of the translation template generalization step.

Furthermore, a pair of the Japanese sentence template and English sentence template is outputted to the translation template file 34 together with the second Japanese senstence template start position (is2), the second Japanese sentence template end position (ie2), the second Japanese sentence template phrase category (c2), the second bit series for selecting Japanese sentence words to be replaced with variables (v2), the second English sentence template start position (js2), the second English sentence template end position (je2), the second English sentence template phrase category (d2), and the second bit series for selecting English sentence words to be replaced with variables (w2) (Step 1935). Finally, a pair of the Japanese sentence for display and English sentence for display is outputted to the display device 5 (Step 1936).

An example pair of the Japanese sentence for display and English sentence for display which is displayed on the display device 5 by Step 1936 is shown in FIG. 21(c). The translation template which corresponds to it is shown in FIG. 5(c).

Next, the Japanese-English translation template learning system of the second embodiment of the present invention will be explained. This second embodiment is different from the first embodiment mentioned above in a point that parts to be replaced with variables in a bilingual pair of sentences are designated by a human. In this embodiment, designation of parts to be replaced with variables is done only for the Japanese sentence. Whether the designated parts are actually phrases or not is checked by the system. The parts to be replaced with variables in the English sentence is automatically determined by the system.

The hardware configuration of this embodiment is the same as that of the first embodiment as shown in FIG. 1. The Japanese morphological analysis table 21, English morphological analysis table 22, Japanese phrase analysis table 23, and English phrase analysis table 24 in the storage 2 and the Japanese-English bilingual dictionary file 31, Japanese dictionary file 32, English dictionary file 33, and translation template file 34 in the secondary storage 3 are also the same as those of the first embodiment.

Figure 30:
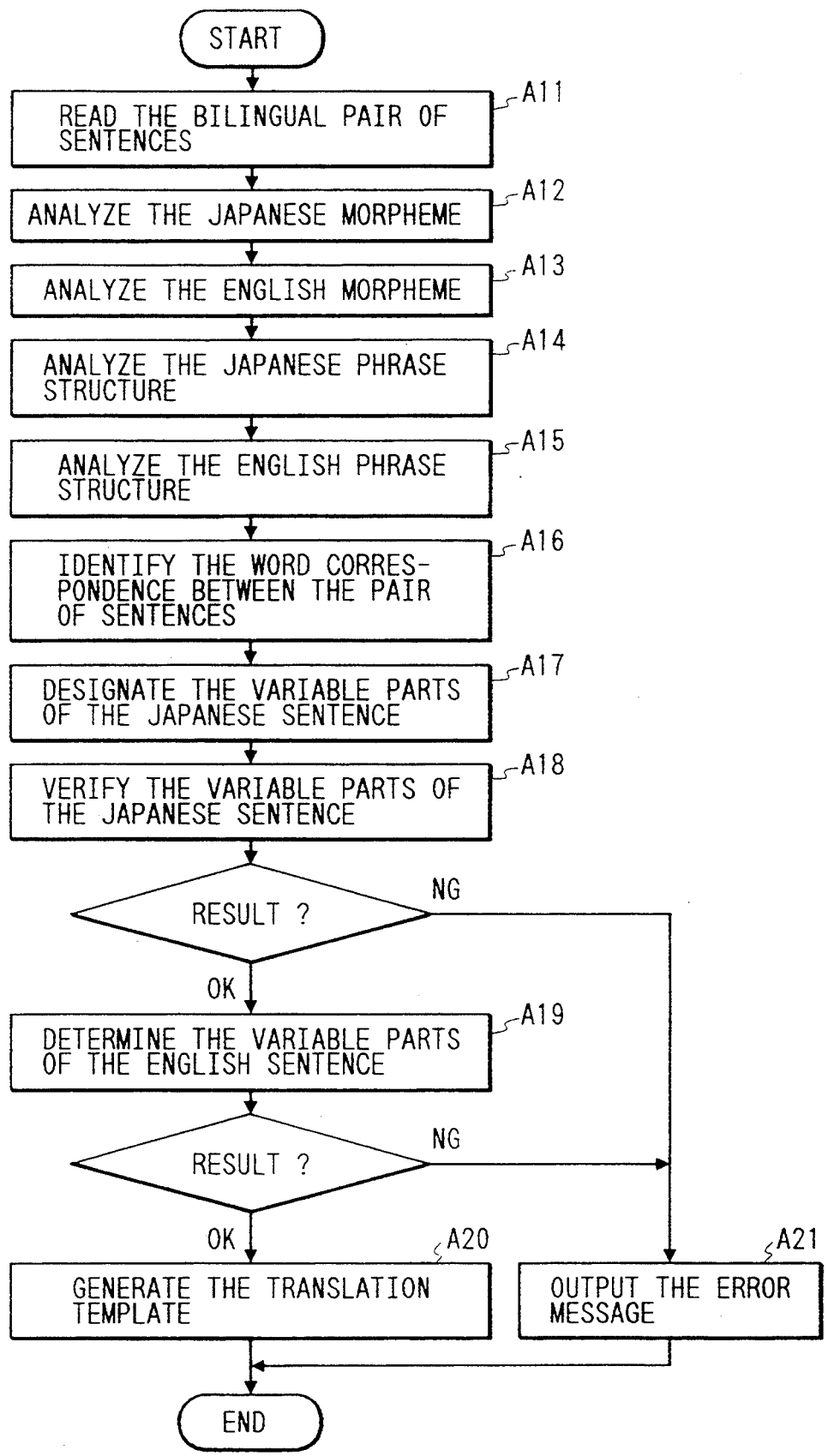
FIG. 30 is a flow chart of the translation template learning of the second embodiment.

The translation template learning of this embodiment is shown in the flow chart in FIG. 30.

Firstly, in the bilingual pair of sentences reading step A11, the Japanese sentence and English sentence which are mutually equivalent are read through the input device 4. Next, in the Japanese morphological analysis step A12, the words constituting the Japanese sentence are identified with reference to the Japanese dictionary file 32. By the Japanese morphological analysis step A12, values are set to the occurred form 211, standard form 212, and part of speech 213 of the Japanese morphological analysis table 21. Next, in the English morphological analysis step A13, the words constituting the English sentence are identified with reference to the English dictionary file 33. By the English morphological analysis step A13, values are set to the occurred form 221, standard form 222, and part of speech 223 of the English morphological analysis table 22.

Furthermore, in the Japanese phrase analysis step A14, candidate phrases contained in the Japanese sentence are extracted and the Japanese phrase analysis table 23 is obtained. Next, in the English phrase analysis step A15, candidate phrases contained in the English sentence are extracted and the English phrase analysis table 24 is obtained. Next, in the word correspondence between pair of sentences identification step A16, the word correspondence between the Japanese sentence and the English sentence is identified with reference to the Japanese-English bilingual dictionary file 31. By the word correspondence between pair of sentences identification step A16, values are set to the corresponding word number 214 in the Japanese morphological analysis table 21 and the corresponding word number 224 in the English morphological analysis table 22.

Next, in the Japanese sentence variable part designation step A17, the part to be replaced with variables in the Japanese sentence is designated by the user. For this operation, the Japanese sentence and English sentence are displayed in the display device. Furthermore, the word correspondence identified by the word correspondence between pair of sentences identification step A16 is shown. In other words, both the word of the Japanese sentence at the cursor and the corresponding word in the English sentence are reversely displayed. When the cursor is moved, the reversely displayed words are changed. The user checks the word correspondence between the Japanese sentence and English sentence and designates the parts of the Japanese sentence to be replaced with variables.

Next, in the Japanese sentence variable part verification step A18, whether each of the parts of the Japanese sentence designated by the user is actually as a phrase or not is judged with reference to the Japanese phrase analysis table 23. When the designated parts are actually phrases, in the English sentence variable part determination step A19, the phrases in the English sentence which corresponds to the designated phrases in the Japanese sentence are extracted with reference to the corresponding word number 214 of the Japanese morphological analysis table 21, the corresponding word number 224 of the English morphological analysis table 22, and the English phrase analysis table 24. A corresponding phrase is one which includes all words corresponding to the words contained in a phrase in the Japanese sentence but does not include words corresponding to the words which are not contained in the phrase in the Japanese sentence.

When the corresponding phrases in the English sentence can be extracted for the designated phrases in the Japanese sentence, in the translation template generation step A20, a translation template is generated by replacing the designated phrases in the Japanese sentence and the corresponding phrases in the English sentence with variables which are mutually correspondent. The generated translation template is outputted to the translation template file 34.

Furthermore, in the Japanese sentence variable part verification step A18, when any part of the Japanese sentence designated by the user proves not to be a phrase, the step jumps to the error message output step A21 and a message indicating that the designation of the variable parts is not appropriate is outputted to the display device 5.

In the English sentence variable part determination step A19, when the phrase of the English sentence which corresponds to any of the designated phrases in the Japanese sentence cannot be extracted, the step jumps to the error message output step A21 and a message indicating that the designation of the variable part is not appropriate is outputted to the display device 5.

Next, the Japanese-English translation template learning system of the third embodiment of the present invention will be explained. According to the second embodiment, the parts to be replaced with variables are designated for the Japanese sentence and the corresponding parts of the English sentence is automatically extracted. However, according to the third embodiment, the parts to be replaced with variables are designated by a human for both the Japanese sentence and English sentence. Whether the designated parts of the Japanese sentence and the designated parts of the English sentence are actually phrases and are mutually correspondent or not is checked by the system.

The hardware configuration of this embodiment is the same as that of the first embodiment as shown in FIG. 1. The Japanese morphological analysis table 21, English morphological analysis table 22, Japanese phrase analysis table 23, and English phrase analysis table 24 in the storage 2 and the Japanese-English bilingual dictionary file 31, Japanese dictionary file 32, English dictionary file 33, and translation template file 34 in the secondary storage 3 are also the same as those of the first embodiment.

The translation template learning of this embodiment is shown in the flow chart in FIG. 31.

The bilingual pair of sentences reading step B11, Japanese morphological analysis step B12, English morphological analysis step B13, Japanese phrase analysis step B14, English phrase analysis step B15, and word correspondence between pair of sentences identification step B16 are exactly the same as the steps A11 to A16 of the second embodiment.

Next, in the Japanese sentence and English sentence variable part designation step B17, the part to be replaced with variables in the Japanese sentence and the part to be replaced with variables in the English sentence are designated by the user. Next, in the Japanese sentence variable part verification step B18, whether the part of the Japanese sentence designated by the user is actually a phrase or not is judged with reference to the Japanese phrase analysis table 23. When the designated part proves to be a phrase, in the English sentence variable part verification step B19, whether the part of the English sentence designated by the user is actually a phrase or not is judged with reference to the English phrase analysis table 24. When the designated part proves to be a phrase, in the Japanese sentence and English sentence variable part correspondence verification step B20, whether the designated phrase of the Japanese sentence and the designated phrase of the English sentence are mutually correspondent or not is checked with reference to the corresponding word number 214 of the Japanese morphological analysis table 21 and the corresponding word number 224 of the English morphological analysis table 22. When the designated phrase of the Japanese sentence and the designated phrase of the English sentence are mutually correspondent, in the translation template generation step B21, a translation template is generated by replacing both the designated phrase of the Japanese sentence and the designated phrase of the English sentence with an identical variable and outputted to the translation template file 34.

When the designated part of the Japanese sentence proves not to be a phrase by the Japanese sentence variable part verification step B18, or the designated part of the English sentence proves not to be a phrase by the English sentence variable part verification step B19, or it is judged by the Japanese sentence and English sentence variable part correspondence verification step B20 that the designated phrase of the Japanese sentence and the designated phrase of the English sentence are not mutually correspondent, the step jumps to the error message output step B22 and a message indicating that the designation of the variable parts is not appropriate is outputted to the display device 5.

Furthermore, the generated translation templates may be displayed so that the user can remove inappropriate ones.

According to the present invention, translation templates can be automatically learned (generated) from a bilingual pair of sentences. Therefore, there is no need to prepare a plurality of similar bilingual pairs of sentences. Furthermore, this learning method makes it possible to learn from a bilingual pair of sentences including a part wherein the word and phrase correspondence is not clear and translation templates which allow high quality translation like a human can be obtained. Furthermore, translation templates wherein phrases of various levels are replaced with variables or translation templates which correspond to a fragment of a bilingual pair of sentences can also be learned. Therefore, the use range of a bilingual pair of sentences can be widened.

What is claimed is:

1. A method of automatically generating a translation template in a system for automatically processing sentences in at least a first language and a second language, said method comprising the steps of:

reading a sentence in said first language and in said second language;

identifying correspondence between words of said first language sentence and said second language sentence which are read in said sentence reading step by referring to a bilingual dictionary between said first and second languages; and generating a pair of a first language template and a second language template by selecting an optional subset from the set of word correspondences identified in said word correspondence identification step and replacing a corresponding word in both said first language sentence and said second language sentence with an identical variable for each correspondence belonging to the above subset, said translation templates include a pair of templates of a sentence in said first language and a sentence in said second language which are respective translations of a same sentence, both of said pair of templates include a sentence including at least one variable which can be replaced with at least one of phrases or words.

2. A translation template generating method according to claim 1, said method further comprising the step of:

displaying the pair of said first language sentence and said second language sentence, which are the source of said generated translation template, in a format that parts which are replaced with variables and other parts are distinguished from each other.

3. A method of automatically generating a translation template according to claim 1, said method further comprising the steps of:

extracting candidate phrases from said first language sentence included in said translation template;

extracting candidate phrases from said second language sentence included in said translation template; and generating a new pair of a first language template and a second language template by replacing both the candidate phrase in the first language template and the candidate phrase in the second language template with an identical variable when a pair of a candidate phrase extracted by said step of extracting candidate phrases from said first language sentence and a candidate phrase extracted by said step of extracting candidate phrases from said second language sentence which contain the same variable set is found.

4. A translation template generating method according to claim 3, said method further comprising the step of:

displaying the pair of said first language sentence and said second language sentence, which are the source of said generated translation template, in a format that parts which are replaced with variables and other parts are distinguished from each other.

5. A method of automatically generating a translation template according to claim 1, said method further comprising the steps of:

extracting candidate phrases from said first language sentence included in said translation template;

extracting candidate phrases from said second language sentence included in said translation template; and separating the candidate phrase in said first language sentence and the candidate phrase in said second language sentence and generating a new translation template from the separated parts when a pair of a candidate phrase extracted by said step of extracting candidate phrases from said first language sentence and a candidate phrase extracted by said step of extracting candidate phrases from said second language sentence which contain the same variable set is found.

6. A translation template generating method according to claim 3, said method further comprising the step of:

displaying the pair of said first language sentence and said second language sentence, which are the source of said generated translation template, in a format that parts which are replaced with variables and other parts are distinguished from each other.

7. A method of automatically generating a translation template in a system for automatically processing sentences in at least a first language and a second language, said method comprising the steps of:

reading a sentence in said first language and in said second language;

identifying correspondence between words of said first language sentence and said second language sentence which are read in said sentence reading step;

designating parts of said first language sentence to be replaced with variables;

extracting phrases of said second language sentence which correspond to the phrases of said designated parts of said first language sentence; and generating a translation template by replacing the phrases of said designated parts of said first language sentence and the corresponding phrases of said second language sentence with variables, said translation template includes a pair of templates of a sentence in said first language and a sentence in said second language which are respective translations of a same sentence, both of said pair of templates including a sentence including at least one variable which can be replaced with at least one of phrases or words.

8. A translation template generating method according to claim 4, further comprising the step of:

judging whether said designated parts of said first language sentence are actual phrases.

9. A translation template generating method according to claim 7, said method further comprising the step of:

displaying results of said identifying step before said designating step is executed.

10. A translation template generating method according to claim 7, said method further comprising the step of:

displaying the pair of said first language sentence and said second language sentence, which are the source of said generated translation template, in a format that the parts which are replaced with variables and the other parts are distinguished from each other.

11. A method of automatically generating a translation template in a system for automatically processing sentences in at least a first language and a second language, said method comprising the steps of:

reading a sentence in said first language and in said second language;

identifying correspondence between the words of said first language sentence and said second language sentence which are read in said bilingual pair of sentence reading step;

designating parts of said first language sentence and said second language sentence to be replaced with variables; and generating a translation template by replacing said designated parts of said first language sentence and said designated parts of said second language sentence with variables, said translation template includes a pair of templates of a sentence in said first language and a sentence in said second language which are respective translations of a same sentence, both of said pair of templates including a sentence including at least one variable which can be replaced with at least one of phrases or words.

12. A translation template generating method according to claim 11, said method further comprising the steps of:

judging whether said designated parts of said first language sentence are actually phrases;

judging whether said designated parts of said second language sentence are actually phrases; and judging whether said designated parts of said first language sentence and said designated parts of said second language sentence are mutually correspondent.

13. A translation template generating method according to claim 11, said method further comprising the step of:

displaying results of said identifying step before said designating step is executed.

14. A translation template generating method according to claim 11, said method further comprising the step of:

displaying the pair of said first language sentence and said second language sentence, which are the source of said generated translation template, in a format that parts which are replaced with variables and other parts are distinguished from each other.

15. A system for automatically generating a translation template by processing sentences in at least a first language and a second language, comprising:

bilingual sentence reading means for reading a sentence in said first language and in said second language:

identification means for identifying correspondence between words of said first language sentence and said second language sentence read by said bilingual sentence reading means by referring to a bilingual dictionary between said first and second languages; and translation template generation means for generating a pair of a first language template and a second language template by selecting an optional subset from said correspondence identified by said identification means and replacing both words in said first language sentence and words in said second language sentence with identical variables for each identified correspondence, said translation template including a sentence in said first language and a sentence in said second language which are respective translations of a same sentence, both of said templates including a sentence including at least one variable which can be replaced with at least one of phrases or words.

16. A translation template learning system according to claim 15, further comprising:

means for designating parts of said first language sentence to be replaced with variables.

17. A translation template learning system according to claim 15, further comprising:

means for designating the parts of said first language sentence and said second language sentence to be replaced with variables.

18. A translation template learning system according to claim 15, further comprising:

means for displaying said word correspondence between pair of sentences identification result.

19. A translation template learning system according to claim 15, further comprising:

means for displaying the pair of first language sentence and second language sentence, which are the source of the generated translation template, in a format that parts which are replaced with variables and other parts are distinguished from each other.

* * * * *